(12) United States Patent
Paterson et al.

(10) Patent No.: US 11,475,074 B2
(45) Date of Patent: Oct. 18, 2022

(54) REAL-TIME DOCUMENT FILTERING SYSTEMS AND METHODS

(71) Applicant: FutureVault Inc., Toronto (CA)

(72) Inventors: Gordon Scott Paterson, Toronto (CA); Michael Bradley, Toronto (CA); Brad Rosenberg, Toronto (CA); Ka Fu Ko, Mississauga (CA)

(73) Assignee: FutureVault Inc., Toronto (CA)

( * ) Notice: Subject to any disclaimer, the term of this patent is extended or adjusted under 35 U.S.C. 154(b) by 468 days.

(21) Appl. No.: 15/690,797

(22) Filed: Aug. 30, 2017

(65) Prior Publication Data

US 2018/0067932 A1 Mar. 8, 2018

Related U.S. Application Data

(60) Provisional application No. 62/383,293, filed on Sep. 2, 2016.

(51) Int. Cl.

| | |
|---|---|
| *G06F 16/93* | (2019.01) |
| *G06F 16/14* | (2019.01) |
| *G06F 16/16* | (2019.01) |
| *G06F 16/28* | (2019.01) |
| *G06F 3/04817* | (2022.01) |
| *G06F 3/0482* | (2013.01) |

(52) U.S. Cl.
CPC ............ *G06F 16/93* (2019.01); *G06F 16/156* (2019.01); *G06F 16/168* (2019.01); *G06F 16/287* (2019.01); *G06F 3/0482* (2013.01); *G06F 3/04817* (2013.01)

(58) Field of Classification Search
CPC ...................................................... G06F 16/93
See application file for complete search history.

(56) References Cited

U.S. PATENT DOCUMENTS

| | | |
|---|---|---|
| 5,553,145 A | 9/1996 | Micali |
| 5,629,982 A | 5/1997 | Micali |
| 5,689,705 A | 11/1997 | Fino et al. |
| 5,991,769 A | 11/1999 | Fino et al. |

(Continued)

OTHER PUBLICATIONS

US 9,026,197 B2, 05/2015, Cohen et al. (withdrawn)

(Continued)

*Primary Examiner* — Mark D Featherstone
*Assistant Examiner* — Tony Wu

(57) ABSTRACT

Methods, systems and computer program products for organizing and displaying in real-time data related to a plurality of documents. A plurality of documents and a plurality of entity identifiers are stored in a relational database storage. Each entity identifier has an entity type selected from a plurality of entity types. A plurality of entity associations between the plurality of entity identifiers and the plurality of documents are stored in a non-relational database storage. Each entity association defines a relationship between one or more entity identifiers and a selected document in the plurality of documents. A plurality of file icons are displayed in a display interface. The plurality of file icons includes active icons corresponding to a selection of the plurality of documents where the selection is determined by querying the non-relational database storage using at least one currently-selected entity identifier.

19 Claims, 20 Drawing Sheets

(56) References Cited

U.S. PATENT DOCUMENTS

| | | | |
|---|---|---|---|
| 6,137,884 A | 10/2000 | Micali |
| 6,289,406 B1 | 9/2001 | Chambers et al. |
| 6,289,460 B1 | 9/2001 | Hajmiragha |
| 6,457,062 B1 | 9/2002 | Pivowar et al. |
| 6,539,401 B1 | 3/2003 | Fino et al. |
| 6,658,147 B2 | 12/2003 | Gorbatov et al. |
| 6,876,766 B2 | 4/2005 | Gorbatov et al. |
| 6,944,648 B2 | 9/2005 | Cochran et al. |
| 7,031,526 B2 | 4/2006 | Gorbatov et al. |
| 7,054,758 B2 | 5/2006 | Gill-Garrison et al. |
| 7,174,043 B2 | 2/2007 | Lossev et al. |
| 7,254,035 B2 | 8/2007 | Sasaki et al. |
| 7,382,921 B2 | 6/2008 | Lossev et al. |
| 7,437,003 B1 | 10/2008 | Gorbatov et al. |
| 7,450,763 B2 | 11/2008 | Gorbatov et al. |
| 7,685,506 B2 | 3/2010 | Fino et al. |
| 7,783,594 B1 | 8/2010 | Pachikov |
| 7,812,682 B2 | 10/2010 | Boroditsky et al. |
| 8,014,630 B1 | 9/2011 | Polyakov et al. |
| 8,072,273 B2 | 12/2011 | Boroditsky et al. |
| 8,239,496 B2 | 8/2012 | Peterson et al. |
| 8,286,199 B1 | 10/2012 | Pulaski et al. |
| 8,290,228 B2 | 10/2012 | Cohen et al. |
| 8,311,938 B2 | 11/2012 | Shivers et al. |
| 8,463,007 B2 | 6/2013 | Steinberg et al. |
| 8,504,519 B1 | 8/2013 | Sachs et al. |
| 8,542,900 B2 | 9/2013 | Tolkowsky et al. |
| 8,655,961 B2 | 2/2014 | McCabe et al. |
| 8,670,603 B2 | 3/2014 | Tolkowsky et al. |
| 8,693,756 B2 | 4/2014 | Tolkowsky et al. |
| 8,781,193 B2 | 7/2014 | Steinberg et al. |
| 8,838,980 B2 | 9/2014 | Gonser et al. |
| 8,855,744 B2 | 10/2014 | Tolkowsky et al. |
| 8,862,575 B2 | 10/2014 | Shivers et al. |
| 8,880,597 B1 | 11/2014 | Pachikov et al. |
| 8,910,258 B2 | 12/2014 | Gonser et al. |
| 8,949,706 B2 | 2/2015 | McCabe et al. |
| 8,949,708 B2 | 2/2015 | Peterson et al. |
| 8,953,228 B1 | 2/2015 | Mehers |
| 8,996,457 B2 | 3/2015 | Sachs et al. |
| 9,007,390 B2 | 4/2015 | Lang et al. |
| 9,008,367 B2 | 4/2015 | Tolkowsky et al. |
| 9,008,754 B2 | 4/2015 | Steinberg et al. |
| 9,014,453 B2 | 4/2015 | Steinberg et al. |
| 9,144,394 B2 | 5/2015 | Cohen et al. |
| 9,053,165 B2 | 6/2015 | van Rossum |
| 9,075,898 B1 | 7/2015 | Ayzenshtat et al. |
| 9,101,286 B2 | 8/2015 | Tolkowsky et al. |
| 9,129,095 B1 | 9/2015 | Lm et al. |
| 9,147,131 B2 | 9/2015 | Libin |
| 9,152,730 B2 | 10/2015 | Bignert et al. |
| 9,171,132 B1 | 10/2015 | Pachikov et al. |
| 9,171,203 B2 | 10/2015 | Chajed et al. |
| 9,213,917 B2 | 12/2015 | Pashintsev et al. |
| 9,216,065 B2 | 12/2015 | Cohen et al. |
| 9,219,753 B2 | 12/2015 | Fleischman et al. |
| 9,223,417 B1 | 12/2015 | Polyakov et al. |
| 9,230,130 B2 | 1/2016 | Peterson et al. |
| 9,235,768 B1 | 1/2016 | Pashintsev et al. |
| 9,251,131 B2 | 2/2016 | McCabe et al. |
| 9,265,458 B2 | 2/2016 | Stack |
| 9,268,758 B2 | 2/2016 | Gonser et al. |
| 9,285,985 B2 | 3/2016 | Lang et al. |
| 9,292,563 B1 | 3/2016 | Engberg et al. |
| 9,292,876 B1 | 3/2016 | Shimkus |
| 9,305,334 B2 | 4/2016 | Barzelay et al. |
| 9,308,052 B2 | 4/2016 | Tolkowsky |
| 9,311,548 B2 | 4/2016 | Constantinou et al. |
| 9,311,549 B2 | 4/2016 | Libin et al. |
| 9,348,836 B2 | 5/2016 | Sachs et al. |
| 9,442,627 B2 | 9/2016 | Sarnoff et al. |
| 9,454,290 B1 | 9/2016 | Ma et al. |
| 9,454,671 B2 | 9/2016 | Engberg et al. |
| 9,460,168 B1 | 10/2016 | Sinclair |
| 9,501,496 B2 | 11/2016 | Constantinou et al. |
| 9,503,402 B2 | 11/2016 | Cue et al. |
| 9,514,117 B2 | 12/2016 | Gonser |
| 9,514,123 B2 | 12/2016 | Goel et al. |
| 9,519,725 B2 | 12/2016 | Libin et al. |
| 9,544,373 B2 | 1/2017 | Poletto et al. |
| 9,558,401 B2 | 1/2017 | Chajed et al. |
| 9,563,783 B2 | 2/2017 | Szebeni et al. |
| 9,576,071 B2 | 2/2017 | Metreveli et al. |
| 9,600,468 B2 | 3/2017 | Mizuguchi et al. |
| 9,607,063 B1 | 3/2017 | Cao et al. |
| 9,613,319 B1 | 4/2017 | Yu et al. |
| 9,672,556 B2 | 6/2017 | Welch et al. |
| 9,679,018 B1 | 6/2017 | Yuksel et al. |
| 9,690,816 B2 | 6/2017 | Dozier et al. |
| 9,710,523 B2 | 7/2017 | Skurtovich, Jr. et al. |
| 9,710,544 B1 | 7/2017 | Smith et al. |
| 9,710,556 B2 | 7/2017 | Koperski et al. |
| 9,715,625 B2 | 7/2017 | Stadermann et al. |
| 9,721,002 B2 | 8/2017 | Pfeifer et al. |
| 9,721,039 B2 | 8/2017 | Bier et al. |
| 9,727,617 B1 | 8/2017 | Segalis et al. |
| 9,734,217 B2 | 8/2017 | Kara |
| 9,740,709 B1 | 8/2017 | Mawji et al. |
| 9,740,771 B2 | 8/2017 | Byron et al. |
| 9,753,953 B2 | 9/2017 | Koppes et al. |
| 9,754,021 B2 | 9/2017 | Byron et al. |
| 9,760,570 B2 | 9/2017 | Laroco, Jr. et al. |
| 9,772,996 B2 | 9/2017 | Sheafer et al. |
| 9,785,696 B1 | 10/2017 | Yakhnenko et al. |
| 9,787,760 B2 | 10/2017 | Folkening |
| 9,794,766 B2 | 10/2017 | Dua et al. |
| 9,798,787 B1 | 10/2017 | Beard et al. |
| 9,798,829 B1 | 10/2017 | Baisley |
| 9,805,004 B2 | 10/2017 | Myers et al. |
| 9,805,338 B1 | 10/2017 | Ghosn et al. |
| 9,817,806 B1 | 11/2017 | Avery et al. |
| 9,817,888 B2 | 11/2017 | Deshpande et al. |
| 9,830,381 B2 | 11/2017 | Fan et al. |
| 9,830,390 B2 | 11/2017 | Hong et al. |
| 9,836,453 B2 | 12/2017 | Radford et al. |
| 9,838,280 B2 | 12/2017 | Boe et al. |
| 9,846,731 B2 | 12/2017 | McGrew et al. |
| 9,864,795 B1 | 1/2018 | Halevy et al. |
| 9,866,927 B2 | 1/2018 | Ganjam et al. |
| 9,870,423 B1 | 1/2018 | Bousquet et al. |
| 9,886,430 B2 | 2/2018 | Patten et al. |
| 9,892,208 B2 | 2/2018 | Anastasakos et al. |
| 9,892,465 B2 | 2/2018 | Love et al. |
| 9,898,463 B2 | 2/2018 | Toyama |
| 2002/0038290 A1 | 3/2002 | Cochran et al. |
| 2002/0038318 A1 | 3/2002 | Cochran et al. |
| 2002/0082943 A1 | 6/2002 | Ibe |
| 2002/0089825 A1 | 7/2002 | Sasaki et al. |
| 2002/0149630 A1 | 10/2002 | Kitainik et al. |
| 2002/0150297 A1 | 10/2002 | Gorbatov et al. |
| 2002/0152240 A1 | 10/2002 | Kitainik et al. |
| 2003/0023387 A1 | 1/2003 | Gill-Garrison et al. |
| 2003/0172006 A1 | 9/2003 | Fino et al. |
| 2004/0047506 A1 | 3/2004 | Gorbatov et al. |
| 2004/0109607 A1 | 6/2004 | Gorbatov et al. |
| 2004/0165777 A1 | 8/2004 | Lossev et al. |
| 2004/0213455 A1 | 10/2004 | Lossev et al. |
| 2004/0225884 A1 | 11/2004 | Lorenzini et al. |
| 2005/0244058 A1 | 11/2005 | Gorbatov et al. |
| 2007/0112841 A1 | 5/2007 | Iwayama et al. |
| 2008/0052196 A1 | 2/2008 | Fino et al. |
| 2008/0133473 A1* | 6/2008 | Broder ............... G06F 16/319 |
| 2008/0209313 A1 | 8/2008 | Gonser |
| 2008/0275912 A1 | 11/2008 | Roberts et al. |
| 2009/0024912 A1 | 1/2009 | McCabe et al. |
| 2009/0292786 A1 | 11/2009 | McCabe et al. |
| 2010/0145911 A1 | 6/2010 | Germer et al. |
| 2010/0157041 A1 | 6/2010 | Klaiman et al. |
| 2010/0160764 A1 | 6/2010 | Steinberg et al. |
| 2010/0160773 A1 | 6/2010 | Cohen et al. |
| 2010/0161022 A1 | 6/2010 | Tolkowsky |
| 2010/0161023 A1 | 6/2010 | Cohen et al. |
| 2010/0171819 A1 | 7/2010 | Tolkowsky et al. |
| 2010/0191102 A1 | 7/2010 | Steinberg et al. |

(56) References Cited

U.S. PATENT DOCUMENTS

| | | |
|---|---|---|
| 2010/0220917 A1 | 9/2010 | Steinberg et al. |
| 2010/0222671 A1 | 9/2010 | Cohen et al. |
| 2010/0225403 A1 | 9/2010 | Boroditsky et al. |
| 2010/0228076 A1 | 9/2010 | Blank et al. |
| 2010/0250433 A1 | 9/2010 | Shivers et al. |
| 2010/0287260 A1 | 11/2010 | Peterson et al. |
| 2010/0290693 A1 | 11/2010 | Cohen et al. |
| 2011/0022536 A1 | 1/2011 | Shivers et al. |
| 2011/0047147 A1 | 2/2011 | Shivers et al. |
| 2011/0068839 A1 | 3/2011 | Boroditsky et al. |
| 2011/0196799 A1 | 8/2011 | Fino et al. |
| 2011/0218912 A1 | 9/2011 | Shivers et al. |
| 2011/0276875 A1 | 11/2011 | McCabe et al. |
| 2011/0289105 A1* | 11/2011 | Hershowitz ........... G06F 17/241 707/769 |
| 2011/0314371 A1 | 12/2011 | Peterson et al. |
| 2012/0059811 A1 | 3/2012 | Libin et al. |
| 2012/0060098 A1 | 3/2012 | Libin et al. |
| 2012/0191728 A1 | 7/2012 | Libin et al. |
| 2012/0230565 A1 | 9/2012 | Steinberg et al. |
| 2012/0233044 A1 | 9/2012 | Burger et al. |
| 2013/0019156 A1 | 1/2013 | Gonser et al. |
| 2013/0019289 A1 | 1/2013 | Gonser et al. |
| 2013/0117089 A1 | 5/2013 | Pachikov et al. |
| 2013/0124513 A1 | 5/2013 | Bignert et al. |
| 2013/0159720 A1 | 6/2013 | Gonser et al. |
| 2013/0173727 A1 | 7/2013 | Libin et al. |
| 2013/0174031 A1 | 7/2013 | Constantinou |
| 2013/0212463 A1 | 8/2013 | Pachikov et al. |
| 2013/0226833 A1 | 8/2013 | Allison et al. |
| 2013/0234929 A1 | 9/2013 | Libin |
| 2013/0254111 A1 | 9/2013 | Gonser et al. |
| 2013/0263283 A1 | 10/2013 | Peterson et al. |
| 2013/0307829 A1 | 11/2013 | Libin |
| 2013/0307861 A1 | 11/2013 | Lang et al. |
| 2013/0318063 A1 | 11/2013 | Ayzenshtat et al. |
| 2013/0329030 A1 | 12/2013 | Tolkowsky et al. |
| 2013/0329977 A1 | 12/2013 | Tolkowsky et al. |
| 2014/0006352 A1 | 1/2014 | Sachs et al. |
| 2014/0007005 A1 | 1/2014 | Libin et al. |
| 2014/0029859 A1 | 1/2014 | Libin |
| 2014/0032554 A1 | 1/2014 | Constantinou et al. |
| 2014/0033327 A1* | 1/2014 | Conte .................... G06F 21/60 726/28 |
| 2014/0050396 A1 | 2/2014 | Libin et al. |
| 2014/0050398 A1 | 2/2014 | Pashintsev et al. |
| 2014/0050409 A1 | 2/2014 | Constantinou et al. |
| 2014/0094689 A1 | 4/2014 | Cohen et al. |
| 2014/0094690 A1 | 4/2014 | Tolkowsky et al. |
| 2014/0094691 A1 | 4/2014 | Steinberg et al. |
| 2014/0094692 A1 | 4/2014 | Tolkowsky et al. |
| 2014/0094693 A1 | 4/2014 | Cohen et al. |
| 2014/0100451 A1 | 4/2014 | Tolkowsky et al. |
| 2014/0107479 A1 | 4/2014 | Klaiman et al. |
| 2014/0108382 A1 | 4/2014 | Garg et al. |
| 2014/0111541 A1 | 4/2014 | Tolkowsky et al. |
| 2014/0112539 A1 | 4/2014 | Tolkowsky et al. |
| 2014/0112566 A1 | 4/2014 | Steinberg et al. |
| 2014/0114184 A1 | 4/2014 | Klaiman et al. |
| 2014/0114185 A1 | 4/2014 | Tolkowsky et al. |
| 2014/0121513 A1 | 5/2014 | Tolkowsky et al. |
| 2014/0140597 A1 | 5/2014 | Barzelay et al. |
| 2014/0154650 A1 | 6/2014 | Stack |
| 2014/0157110 A1 | 6/2014 | Abbott, Jr. et al. |
| 2014/0161331 A1 | 6/2014 | Cohen et al. |
| 2014/0164542 A1 | 6/2014 | McCabe et al. |
| 2014/0181213 A1 | 6/2014 | Hunter et al. |
| 2014/0208418 A1 | 7/2014 | Libin |
| 2014/0250491 A1 | 9/2014 | Fleischman et al. |
| 2014/0304249 A1 | 10/2014 | Ayzenshtat et al. |
| 2014/0304518 A1 | 10/2014 | Gonser et al. |
| 2014/0330900 A1 | 11/2014 | Libin et al. |
| 2014/0337373 A1* | 11/2014 | Morsi .................. G06F 16/245 707/769 |
| 2014/0342327 A1 | 11/2014 | Stack |
| 2014/0358613 A1 | 12/2014 | Libin |
| 2014/0363796 A1 | 12/2014 | Stack |
| 2014/0365522 A1* | 12/2014 | Soundararajan ........ G06F 16/28 707/770 |
| 2014/0372956 A1* | 12/2014 | Bisca ...................... G06F 16/93 715/848 |
| 2014/0380232 A1 | 12/2014 | Sarnoff et al. |
| 2015/0012488 A1 | 1/2015 | van Rossum |
| 2015/0012565 A1 | 1/2015 | Engberg et al. |
| 2015/0033102 A1 | 1/2015 | Losvik et al. |
| 2015/0046287 A1 | 2/2015 | Libin |
| 2015/0046367 A1 | 2/2015 | Libin et al. |
| 2015/0046370 A1 | 2/2015 | Libin et al. |
| 2015/0067464 A1 | 3/2015 | McCabe et al. |
| 2015/0067489 A1 | 3/2015 | Zotto et al. |
| 2015/0071549 A1 | 3/2015 | Chajed et al. |
| 2015/0074044 A1 | 3/2015 | Metreveli et al. |
| 2015/0074776 A1 | 3/2015 | Gonser et al. |
| 2015/0081601 A1 | 3/2015 | Ayzenshtat et al. |
| 2015/0088574 A1 | 3/2015 | Libin et al. |
| 2015/0106078 A1* | 4/2015 | Chang .................... G06F 16/35 704/9 |
| 2015/0121298 A1 | 4/2015 | Ma |
| 2015/0130703 A1 | 5/2015 | Ghajar |
| 2015/0134600 A1 | 5/2015 | Eisner et al. |
| 2015/0134614 A1 | 5/2015 | Sachs et al. |
| 2015/0143218 A1 | 5/2015 | Peterson et al. |
| 2015/0143219 A1 | 5/2015 | McCabe et al. |
| 2015/0150090 A1 | 5/2015 | Carroll et al. |
| 2015/0161409 A1 | 6/2015 | Szebeni et al. |
| 2015/0169946 A1 | 6/2015 | Needleman |
| 2015/0180984 A1 | 6/2015 | Poletto et al. |
| 2015/0208975 A1 | 7/2015 | Ghajar |
| 2015/0242116 A1 | 8/2015 | Lang et al. |
| 2015/0244833 A1 | 8/2015 | Grue et al. |
| 2015/0254783 A1 | 9/2015 | Levin et al. |
| 2015/0254794 A1 | 9/2015 | Levin et al. |
| 2015/0254795 A1 | 9/2015 | Levin et al. |
| 2015/0282889 A1 | 10/2015 | Cohen et al. |
| 2015/0296012 A1 | 10/2015 | Piyush et al. |
| 2015/0302524 A1 | 10/2015 | Allison et al. |
| 2016/0012287 A1 | 1/2016 | Chajed et al. |
| 2016/0050177 A1 | 2/2016 | Cue et al. |
| 2016/0055143 A1 | 2/2016 | Goel et al. |
| 2016/0055185 A1 | 2/2016 | Goel et al. |
| 2016/0055188 A1 | 2/2016 | Goel et al. |
| 2016/0055248 A1 | 2/2016 | Goel et al. |
| 2016/0080426 A1 | 3/2016 | Fleischman et al. |
| 2016/0085421 A1 | 3/2016 | Feeney |
| 2016/0125842 A1 | 5/2016 | Weinberg et al. |
| 2016/0127337 A1 | 5/2016 | Fleischman et al. |
| 2016/0127384 A1 | 5/2016 | VoBa |
| 2016/0140101 A1 | 5/2016 | Gosner, Jr. et al. |
| 2016/0170950 A1 | 6/2016 | Malden |
| 2016/0171626 A1 | 6/2016 | Shimkus |
| 2016/0182465 A1 | 6/2016 | Lm et al. |
| 2016/0224517 A1 | 8/2016 | Horn et al. |
| 2016/0224523 A1 | 8/2016 | Shimkus |
| 2016/0224526 A1 | 8/2016 | Gazit et al. |
| 2016/0239471 A1 | 8/2016 | Shimkus |
| 2016/0292443 A1 | 10/2016 | von Muhlen et al. |
| 2016/0378629 A1 | 12/2016 | Gwozdz |
| 2017/0011084 A1 | 1/2017 | Goel et al. |
| 2017/0032523 A1 | 2/2017 | Klaiman et al. |
| 2017/0039180 A1 | 2/2017 | Pruitt et al. |
| 2017/0060981 A1 | 3/2017 | Ben-Tzur |
| 2017/0060984 A1 | 3/2017 | Ben-Tzur |
| 2017/0063888 A1 | 3/2017 | Muddu et al. |
| 2017/0063903 A1 | 3/2017 | Muddu et al. |
| 2017/0063905 A1 | 3/2017 | Muddu et al. |
| 2017/0063910 A1 | 3/2017 | Muddu et al. |
| 2017/0075958 A1 | 3/2017 | Duffy |
| 2017/0075975 A1 | 3/2017 | Charron et al. |
| 2017/0075976 A1 | 3/2017 | Garg |
| 2017/0075980 A1 | 3/2017 | Charron et al. |
| 2017/0091319 A1 | 3/2017 | Legrand et al. |
| 2017/0091833 A1 | 3/2017 | Berger et al. |
| 2017/0098266 A1 | 4/2017 | Taylor |
| 2017/0103118 A1 | 4/2017 | Hu et al. |

(56) References Cited

U.S. PATENT DOCUMENTS

| | | |
|---|---|---|
| 2017/0109348 A1 | 4/2017 | Nagaraj et al. |
| 2017/0124075 A1 | 5/2017 | Deng |
| 2017/0132219 A1 | 5/2017 | Deng |
| 2017/0150516 A1 | 5/2017 | Stephenne et al. |
| 2017/0169493 A1 | 6/2017 | Florance et al. |
| 2017/0177180 A1 | 6/2017 | Bachmann et al. |
| 2017/0177579 A1 | 6/2017 | Li et al. |
| 2017/0199905 A1 | 7/2017 | Ott et al. |
| 2017/0212899 A1 | 7/2017 | Lightner et al. |
| 2017/0220813 A1 | 8/2017 | Mullins et al. |
| 2017/0228564 A1 | 8/2017 | Bendet |
| 2017/0235769 A1 | 8/2017 | Livshits et al. |
| 2017/0235772 A1 | 8/2017 | Livshits et al. |
| 2017/0235786 A9 | 8/2017 | Faith et al. |
| 2017/0255669 A1 | 9/2017 | Ronen et al. |
| 2017/0255694 A1 | 9/2017 | Byron et al. |
| 2017/0270537 A1 | 9/2017 | Papa et al. |
| 2017/0277856 A1 | 9/2017 | De La Torre et al. |
| 2017/0293682 A1 | 10/2017 | Pfeifer et al. |
| 2017/0300461 A1 | 10/2017 | Mital et al. |
| 2017/0300565 A1 | 10/2017 | Calapodescu et al. |
| 2017/0308538 A1 | 10/2017 | Senjalia |
| 2017/0322941 A1 | 11/2017 | Giblin et al. |
| 2017/0323157 A1 | 11/2017 | Guzman et al. |
| 2017/0329806 A1 | 11/2017 | Koppes et al. |
| 2017/0337262 A1 | 11/2017 | Smith et al. |
| 2017/0339471 A1 | 11/2017 | Fisher et al. |
| 2017/0344247 A1 | 11/2017 | Lee et al. |
| 2017/0351656 A1 | 12/2017 | Lysanov |
| 2017/0351749 A1 | 12/2017 | Quirk et al. |
| 2017/0357670 A1 | 12/2017 | Chrapko et al. |
| 2017/0365020 A1 | 12/2017 | Banerjee et al. |
| 2017/0371910 A1 | 12/2017 | Joo et al. |
| 2018/0004822 A1 | 1/2018 | Mulder et al. |
| 2018/0004825 A1 | 1/2018 | Beard et al. |
| 2018/0004843 A1 | 1/2018 | Koperski et al. |
| 2018/0011827 A1 | 1/2018 | Avery et al. |
| 2018/0020121 A1 | 1/2018 | Riedel et al. |
| 2018/0032493 A1 | 2/2018 | Raleigh et al. |
| 2018/0033006 A1 | 2/2018 | Goldman et al. |
| 2018/0039701 A1 | 2/2018 | Pemble et al. |
| 2018/0039889 A1 | 2/2018 | Nanavati et al. |
| 2018/0046623 A1 | 2/2018 | Faith et al. |
| 2018/0046717 A1 | 2/2018 | Hong et al. |

OTHER PUBLICATIONS

Document relating to International Application No. PCT/CA2017/050259, dated Jun. 7, 2017 (International Search Report and Written Opinion).

Extended European Search Report for counterpart European Application No. 17844724.9, dated Mar. 5, 2020.

Bachman, "GraphAware: Towards Online Analytical Processing in Graph Databases", dated Sep. 2013, retrieved from <https://graphaware.com/assets/bachman-msc-thesis.pdf>.

* cited by examiner

FutureVault

> Documents / Vehicles / Automobiles / 2010 Mercedes ML550

Vehicles ▼

- 28 Aircraft(s)
- 2 Automobiles
- 2 2010 Mercedes ML550
- 2 Boat & Watercraft(s)
- 7 Motorcycles
- Off-Road Vehicle(s)

Folder document counts

Suggested Documents/Labels ^

Settings ⚙

Service Invoice
2 Documents

- 📄 2016-01-22 Deer Park Auto Service Repairs
- 📄 2016-01-05 Deer Park Auto Service Repair Invoice ⬆ Drag and drop or click upload documents into the 2010 Mercedes ML550 folder

FIG. 11

REAL-TIME DOCUMENT FILTERING SYSTEMS AND METHODS

CROSS-REFERENCE TO RELATED APPLICATION

This application claims the benefit of U.S. Provisional Patent Application No. 62/383,293, filed Sep. 2, 2016, the entire contents of which are hereby incorporated by reference.

FIELD

The described embodiments relate to managing electronic documents, and in particular systems, methods and computer program products for filtering electronic documents.

BACKGROUND

Filing cabinets and file folders have long been used to store important documents. As important personal and business documents are increasingly generated and disseminated electronically, individuals are using electronic database storage systems to store their important documents. As with physical filing cabinets, electronic folders and documents must be carefully organized and managed to make document retrieval convenient and easy.

Documents relating to different personal and business matters may be stored within the same database structure. An individual may store documents relating to their personal lives, one or more businesses or corporations, as well as documents relating to trusts for their children or spouses. Because electronic documents can be easily duplicated, documents may be stored in multiple locations in a database. For example, multiple copies of a financial document can be quickly and easily stored in different folders for an individual's banking records and their tax records. As a result, the apparent number of documents to be sorted and managed can be much greater with electronic storage systems.

Users typically have high expectations of electronic document management systems. Users expect to be able to rapidly move documents to different storage locations in the document management system and navigate through different sections of the database. As users navigate the database, data displayed about folder content and relationships is expected to be up to date and reflect recent modifications. When the data presented is incorrect or not updated quickly, this can lead to user frustration. With large databases, updates may take time to propagate through the database structure because complex or inefficient computations may be necessary to update different sections of the database. These issues may be particularly noticeable in cloud-based document management systems, where user operations are being processed remotely.

SUMMARY

In a broad aspect, there is provided a method for organizing and displaying in real-time data related to a plurality of documents. The method can include storing a plurality of documents in a relational database storage; storing a plurality of entity identifiers in the relational database storage, each of the plurality of entity identifiers having an entity type selected from a plurality of entity types; recording in a non-relational database storage a plurality of entity associations between the plurality of entity identifiers and the plurality of documents, where each entity association defines a relationship between one or more entity identifier from the plurality of entity identifiers and a selected document in the plurality of documents; and displaying a plurality of file icons in a display interface, the plurality of file icons including active icons corresponding to a selection of the plurality of documents, where the selection is determined by querying the non-relational database storage using at least one currently-selected entity identifier.

In some embodiments, the method may include storing a plurality of document categories in the relational database storage; assigning each document in the plurality of documents to at least one of the document categories; recording in the non-relational database storage a plurality of category associations between the plurality of entity identifiers and the plurality of document categories, where each category association defines a category relationship between a selected category in the plurality of document categories and one or more entity identifiers; and displaying the plurality of file icons by determining a selected plurality of document categories by querying the plurality of category associations in the non-relational database storage using the at least one currently-selected entity identifier; determining the plurality of file icons to include a plurality of category icons corresponding to the selected plurality of document categories; and displaying the plurality of file icons.

In some embodiments, the plurality of document categories are recorded in the non-relation database storage as a category hierarchy including at least one parent category and at least one sub-category nested within each parent category; and the category associations for each parent category inherit the category associations for each of the at least one sub-category nested within that parent category.

In some embodiments, the plurality of category associations are determined by: defining default category associations for each entity type; and determining the plurality of category associations to include the default category associations for the entity type of each entity identifier.

In some embodiments, the method may include storing an additional document in the relational database storage associated with a first document sub-category; updating the entity associations by defining in the non-relational database storage a relationship between the additional document and a particular entity identifier, where the particular entity identifier is not associated with the first document sub-category; and updating the category associations in the non-relational database storage for the first document sub-category to include the particular entity identifier.

In some embodiments, the method may include automatically updating the category associations in the non-relational database storage for each parent category the first document sub-category is nested within.

In some embodiments, the method may include determining the selected plurality of document categories to include all of the document categories associated with the entity type of each of the at least one currently-selected entity identifier.

In some embodiments, the method may include recording in the non-relational database storage an icon status for each of the document categories in the plurality of document categories, where the icon status for each document category is an active icon status indicating that the corresponding category icon is an active icon when at least one of the documents in the selection of the plurality of documents is assigned to that document category and is an inactive icon status otherwise.

In some embodiments, the icon status in the non-relational database storage for each parent category is determined by inheriting the icon status of each sub-category nested within that parent category, and the icon status for the parent category is an active icon status when at least one inherited icon status is active.

In some embodiments, the plurality of file icons displayed include only the active document icons corresponding to the determined selection of the plurality of documents.

In some embodiments, the method may include recording in the non-relational database storage a document count for each of the document categories in the plurality of document categories, the document count for each document category indicating a number of documents in the selection of the plurality of documents associated with that document category.

In some embodiments, the document count in the non-relational database storage for each parent category is determined by inheriting the document count from each sub-category nested within that parent category.

In some embodiments, the method may include modifying the entity associations for a second selected document in the plurality of documents; and automatically triggering an update to the category associations for each of the document categories associated with the second selected document using the modified entity association for that second selected document.

In another broad aspect, there is provided a computer program product for organizing and displaying in real-time data related to a plurality of documents, the computer program product including a non-transitory computer readable storage medium and computer-executable instructions stored on the computer readable storage medium, the instructions for configuring a processor to: store a plurality of documents in a relational database storage; store a plurality of entity identifiers in the relational database storage, each of the plurality of entity identifiers having an entity type selected from a plurality of entity types; record in a non-relational database storage a plurality of entity associations between the plurality of entity identifiers and the plurality of documents, where each entity association comprises a relationship between one or more entity identifier from the plurality of entity identifiers and a selected document in the plurality of documents; and display a plurality of file icons in a display interface, the plurality of file icons including active icons corresponding to a selection of the plurality of documents, where the selection is determined by querying the non-relational database storage using at least one currently-selected entity identifier.

In another broad aspect, there is provided a system for organizing and displaying in real-time data related to a plurality of documents, the system can include: a relational database storage; a non-relational database storage coupled to the relational database storage; and a server in communication with the relational database storage and the non-relational database storage, where the server is configured to store a plurality of documents in the relational database storage; store a plurality of entity identifiers in the relational database storage, each of the plurality of entity identifiers having an entity type selected from a plurality of entity types; record in the non-relational database storage a plurality of entity associations between the plurality of entity identifiers and the plurality of documents, where each entity association defines a relationship between one or more entity identifier from the plurality of entity identifiers and a selected document in the plurality of documents; and determine a plurality of file icons to be displayed in a display interface of a device in communication with the server, the plurality of file icons including active icons corresponding to a selection of the plurality of documents, where the selection is determined by querying the non-relational database storage using at least one currently-selected entity identifier.

In some embodiments, the server may be further configured to store a plurality of document categories in the relational database storage; assign each document in the plurality of documents to at least one of the document categories; record in the non-relational database storage a plurality of category associations between the plurality of entity identifiers and the plurality of document categories, where each category association comprises a category relationship between a selected category in the plurality of document categories and one or more entity identifiers; and determine the plurality of file icons by determining a selected plurality of document categories by querying the plurality of category associations in the non-relational database storage using the at least one currently-selected entity identifier; and determining the plurality of file icons to include a plurality of category icons corresponding to the selected plurality of document categories.

In some embodiments, the plurality of document categories are stored in the non-relational database a category hierarchy including at least one parent category and at least one sub-category nested within each parent category; and the category associations for each parent category inherit the category associations for each of the at least one sub-category nested within that parent category.

In some embodiments, the server may be configured to determine the plurality of category associations by: defining default category associations for each entity type; and determining the plurality of category associations to include the default category associations for the entity type of each entity identifier.

In some embodiments, the server may be configured to: store an additional document in the relational database storage associated with a first document sub-category; update the entity associations by defining in the non-relational database storage a relationship between the additional document and a particular entity identifier, where the particular entity identifier is not associated with the first document sub-category; and update the category associations in the non-relational database storage for the first document sub-category to include the particular entity identifier.

In some embodiments, the server may be configured to trigger an automatic update of the category associations in the non-relational database storage for each parent category the first document sub-category is nested within.

In some embodiments, the server may be configured to: determine the selected plurality of document categories to include all of the document categories associated with the entity type of each of the at least one currently-selected entity identifier.

In some embodiments, the server may be configured to: record in the non-relational database storage an icon status for each of the document categories in the plurality of document categories, where the icon status for each document category is an active icon status indicating that the corresponding category icon is an active icon when at least one of the documents in the selection of the plurality of documents is assigned to that document category and is an inactive icon status otherwise.

In some embodiments, the server may be configured to determine the icon status in the non-relational database storage for each parent category by inheriting the icon status of each sub-category nested within that parent category, and the icon status for the parent category is an active icon status when at least one inherited icon status is active.

In some embodiments, the server may be configured to determine the plurality of file icons to be displayed to include only the active document icons corresponding to the determined selection of the plurality of documents.

In some embodiments, the server may be configured to: record in the non-relational database storage a document count for each of the document categories in the plurality of document categories, the document count for each document category indicating a number of documents in the selection of the plurality of documents associated with that document category.

In some embodiments, the document count in the non-relational database storage for each parent category is determined by inheriting the document count from each sub-category nested within that parent category.

In some embodiments, the server may be configured to: modify the entity association for a second selected document in the plurality of documents; and automatically trigger an update to the category associations for each of the document categories associated with the second selected document using the modified entity association for that second selected document.

BRIEF DESCRIPTION OF THE DRAWINGS

A preferred embodiment of the present invention will now be described in detail with reference to the drawings, in which:

FIG. 8C illustrates a screenshot of an example user interface for defining default category icons in accordance with an example embodiment.

FIG. 8D illustrates a screenshot of an example user interface for filtering file icons by entity status in accordance with an example embodiment.

FIG. 9B illustrates a screenshot of another example user interface for filtering file icons by folder status in accordance with an example embodiment.

FIG. 11 illustrates a screenshot of an example user interface illustrating file icons with document counts in accordance with an example embodiment.

DESCRIPTION OF EXEMPLARY EMBODIMENTS

Figure 1:
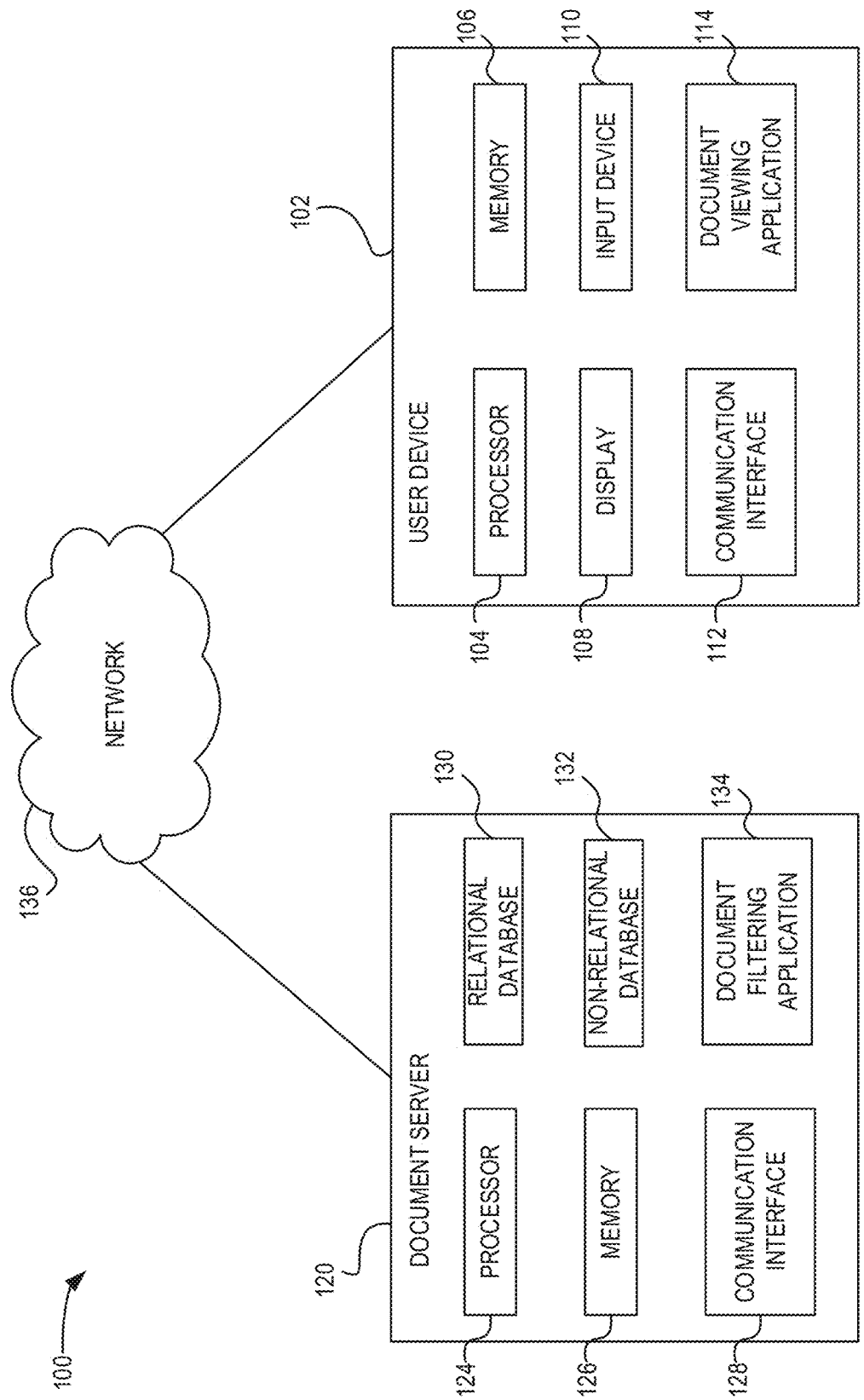
FIG. 1 illustrates a system for filtering and displaying file icons in accordance with an example embodiment.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

In modern operating systems, documents are typically arranged in directory structures stored using relational databases. Because these database structures are well-known, query languages (e.g. SQL) have been developed that facilitate a wide range of operations on these relational databases. However, relational databases may have some drawbacks when computational speed is desired. Relational databases organize the data stored therein into file directories arranged as tables with rows and columns. In general, every row in a table in the relational database includes the same columns, regardless of whether the object being defined in that row has attributes for each column.

In relational databases, recursive calculations can be computationally expensive to perform using SQL queries. As a result, determining whether a folder (and all its sub-folders) is empty, the number of documents within a folder, the size of a folder, is often performed manually.

Similarly, determining the relationship between different document categories and the characteristics of document filed within those categories (and nested sub-categories) can be time consuming and computationally complex. The computational complexity increases as documents are stored across a matrix of different document hierarchies, and associated with multiple document categories and user entities.

Because of this computational complexity, data regarding the folders in the database (such as folder size, folder document counts, folder empty status etc.) may not be tracked and updated in real-time. When users are navigating through document viewing or document management applications, this can result in outdated information being presented to a user, or delays in displaying accurate data. For instance, it may be difficult to determine whether and how many documents are present in high level folders being navigated through. Where important documents related to multiple entities and entity types are stored, each of which may have different associated categories and category hierarchies, providing real-time data about the status of multiple document folders can be difficult.

Embodiments of the systems, methods and computer program products described herein may address some of these above difficulties in browsing and viewing electronic documents such as personal and business documents belonging to multiple entities and entity types. Embodiments described herein may provide remote or cloud based virtual filing cabinets that allow individuals to store documents in association with different categories and user entities. The embodiments described herein may facilitate viewing and filtering digital documents by document associations with business or personal entity identifiers, entity types, jurisdictions, as well as displaying a real-time count of the documents contained in each folder and sub-folder.

Embodiments described herein may provide a hybrid database structure to store documents and document associations. A plurality of documents can be stored in a relational database storage. The documents may include various document types, such as personal documents, business documents, legal documents and so forth.

A plurality of entity identifiers can also be stored in the relational database storage. The entity identifiers may represent different individuals or groups (e.g. a person, particular business, charity) for which documents may be stored in the relational database storage. For example, a user may store documents in the relational database storage that relate to different personal, business or charitable matters they are involved in. Entity identifiers can be defined for each of the different groupings the user wishes to file documents for. Embodiments herein may facilitate the storage, management and navigation of these documents.

A plurality of entity associations between the plurality of entity identifiers and the plurality of documents can be stored in a non-relational database storage. The non-relational database can be implemented as a graph database, where a graph (or edge or relationship), directly relates data items stored therein. The graph database can include data stored in a plurality of nodes. Each node can have data attributes or characteristics associated therewith. The relationship(s) between one or more nodes can be defined directly in the database using edges. As a result, modifications to a particular node can be rapidly perpetuated to related nodes identified by the edge relationship.

Each entity association indicates a relationship between one or more entity identifier and a selected document. Documents may be associated with multiple entity identifiers, for example where they relate to the activities of multiple entities. For instance, a pay stub from a professional corporation to an individual may be stored in the relational database. The entity associations for the pay stub in the non-relational database storage may then be defined to include both the corporate entity identifier and the individual entity identifier.

Entity identifiers and entity associations can be used to filter icons that are displayed to a user navigating the document management system. For instance, a user may wish to view only folders and documents that relate to their personal entity. Accordingly, the user may select their personal entity identifier and deselect all other entity identifiers. The currently selected entity identifier (or identifiers) can be used to query the non-relational database to identify a selection of documents in the plurality of documents. The identified selection of documents may be used to determine the icons that are displayed to the user.

A plurality of file icons can be displayed to the user. The plurality of file icons can include active icons corresponding to the selection of documents determined using the currently selected entity identifier. For example, the displayed file icons may only include folder icons, sub-folder icons, and document icons for documents associated with the currently-selected entity identifier. In other cases, the plurality of file icons may include additional file icons related to the currently-selected entity identifier, such as folder icons and sub-folder icons that may be associated with the entity identifier by default but are currently empty.

A plurality of document categories can be stored in the relational database storage. Each document in the plurality of documents can be assigned to at least one of the document categories. Document categories may reflect the different document types that may be stored in the relational database storage. The document categories may represent a general description of the type of content in the documents stored in a category. Examples of document categories may include an accounting category, a banking category, an insurance category, a tax category and many other document categories. When a user is navigating through the document management application, corresponding category icons or folder icons may be displayed that correspond to the document categories.

A plurality of category associations can be stored in the non-relational database storage between the plurality of entity identifiers and the plurality of document categories. Each category association may include a relationship between a selected category and one or more entity identifiers. The category associations may indicate the entity identifiers for which a category/folder icon may be displayed to a user.

A selected plurality of document categories may be determined by querying the plurality of category associations in the non-relational database using the at least one currently selected entity identifier. The plurality of file icons to be displayed to a user may include a plurality of category icons corresponding to the selected plurality of document categories. Corresponding document icons may also be displayed to a user, e.g. by querying the non-relational database using the at least one currently selected entity identifier and the entity associations.

The plurality of document categories can be structured into a category hierarchy with at least one parent category and at least one child sub-category nested within each parent category. For example, an accounting parent category may have a financial statements sub-category and a general ledger sub-category. A Banking parent category may have a TD first level sub-category and a CIBC first level sub-category, and the TD first level sub-category may have a Savings second-level sub-category and a Checking second-level sub-category. Documents may be assigned to any of those categories or sub-categories.

As mentioned above, the non-relational database storage can be implemented as a graph database. Document representations (e.g. document IDs and names) can be stored as document nodes in the graph database. Each document node can have its corresponding entity associations defined as attributes for that document node. The document node may also include an icon status attribute indicating whether that document node is currently active.

Document categories can also be stored as category nodes in the graph database. Each category node can have its corresponding category associations defined as attributes for that category node. A category node may also include an icon status attribute indicating whether that category node is currently active. The category nodes may also include document count attributes indicating the number of active documents stored therein (or therebelow).

The relationships between documents and the folders they are stored in in the relational database can then be defined using edges in the graph database between document nodes and category nodes. Similarly, the parent-child relationship(s) between folders can also be defined using edges between category nodes in the graph database. Accordingly, attributes can be inherited from document nodes to category nodes directly using the edge relationships therebetween. These attributes can then be automatically updated to parent nodes using the edges between category nodes. This allows the associations between categories and entities, document counts, and icon statuses to be updated rapidly in response to changes to a particular node—as the changes can be perpetuated directly to the nodes connected thereto by edges.

Events generally trigger category associations to be automatically updated. Events may include document events such as storing a document, moving a document, deleting a document, modifying a document's entity associations. Events may also include entity events such as modifying an entity identifier's entity type, modifying default category associations for an entity type, adding an entity, deleting an entity. When an association update is triggered, the category associations and/or entity associations in the non-relational database can be automatically updated. The category associations may be automatically updated so that parent categories can inherit category association updates from nested sub-categories and nested documents. In some cases, the category associations and entity associations in the non-relational database are only modified in response to event triggers. As mentioned above, where the non-relational database is implemented as a graph database updates may be automatically triggered to the relevant affected categories and documents using the edges of the graph database.

The relation/edges between nodes may be defined in each node as a relationship attribute similarly to a linked list. Each node may be indexed based on a node id, and the relationship attribute(s) for each node can identify all adjacent nodes for that node. When events occur that may trigger updates to the data in the non-relational database, the updates may be applied beginning with a node directly affected by the event, and then the related nodes can be traversed starting from a known node to the root node. For example, entity associations/category associations can be updated as the system traverse backwards along the connected nodes based on what has changed from the currently selected child node.

The category associations for each parent category can inherit the category associations for each of the sub-folders nested within that parent category. For example, a new document associated with a first entity may be stored in the Savings second-level sub-category. The category associations for the Savings second-level sub-category may then be defined or updated to include the entity identifiers associated with the newly stored document. In response to this event (storage of the document in the Savings sub-category) both the TD first level sub-category and in turn the Banking parent category may automatically inherit this additional entity identifier in their category associations.

When the new document is stored in the relational database storage, because the category associations of the parent sub-categories and parent categories can automatically inherit the entity associations of that new document from the category associations of the sub-category where the document is stored, it may not be necessary to assign the document to each of the parent categories and sub-categories. In other cases, the document may also be assigned (e.g. filed) to each of those categories and sub-categories in the relational database storage as well.

Each entity identifier may correspond to, or be associated with, an entity type. An entity type represents the sort or kind of group or individual for which documents may be stored. Examples of entity types include persons, trusts, sole proprietorships, partnerships, corporations, limited liability corporations, charities and so on.

In some cases, default category associations may be defined for each entity type. The plurality of category associations stored in the non-relational database storage may include the default category associations for the entity types corresponding to the entity identifiers having documents stored in the relational database structure. These default category associations may be user-defined for each entity type. For example, categories where documents would be expected for a particular entity type can be used to define the default category associations (e.g. partnership agreement documents for a partnership entity type, documents of incorporation for corporate entity types). In the example of a graph database implementation, the attributes of a category node may be defined (at least initially) to include the default category associations for that category node.

When a user is navigating through documents in the database the user may choose to view or hide empty categories. For example, when a user chooses to view/show empty document categories, the selected plurality of document categories (used to determine the plurality of category icons to display) may be determined to include all of the document categories associated with the entity type of each of the at least one currently-selected entity identifiers. In other cases, the plurality of file icons displayed to a user may include only active file icons that correspond to the selection of documents determined by querying the non-relational database using the currently-selected entity identifiers. That is, only icons for categories and sub-categories having at least one document stored therein or in a sub-category nested therebelow may be displayed to a user.

In some cases, an icon status can be stored in the non-relational database storage for each of the document categories in the plurality of document categories. The icon status may be set to an active icon status indicating that the corresponding category icon is an active icon when at least one of the documents in the selection of the plurality of documents is assigned to that document category. Otherwise, the icon status may be set to an inactive or empty icon status. The icon status for parent categories and sub-categories may be determined by inheriting the icon status of each sub-category nested within that parent category. An active icon status inherited from a nested sub-category may dominate over any inherited inactive icon statuses (since at least one nested sub-category is active).

A document count can also be stored in the non-relational database storage for each of the document categories in the plurality of document categories. The document count for a document category indicates a number of documents in that document category and in nested sub-categories. Accordingly, when documents are stored or assigned to various categories, or entity associations are modified, the document counts for each category can be inherited from each sub-category nested within that parent category. Document counts may also be determined using icon status flags. Similarly, document counts may also be updated as filters are applied by a user, such as modifying the currently-selected entity identifier. Applying a filter can provide another example of an update triggering event that may cause updates to be perpetuated through the non-relational database.

The embodiments described herein may provide for real-time management and processing of data relating to a plurality of documents. Attributes of documents and categories, and their relationships, are stored in a non-relational database that can be quickly accessed when a user applies various filters to navigate through the stored documents. Updates to category associations can be triggered when modifications are made to documents in the relational database storage. Updates can also be triggered when modifications are made to entities or to the filters a user is applying in the user interface. These updates can then be inherited upward through a category hierarchy to rapidly update the characteristics for all affected categories. This also allows the system to rapidly update documents for the categories.

Referring now to FIG. 1, shown therein is an example embodiment of a system 100 that may be used to filter documents for real-time display. System 100 generally comprises a plurality of computers connected via data communication network 136, which itself may be connected to the Internet. In the example shown in FIG. 1, system 100 includes a user device 102 that is coupled to a document server 120 over network 136.

The connection between network 136 and the Internet may be made via a firewall server (not shown). In some cases, there may be multiple links or firewalls, or both, between network 136 and the Internet. Organizations may operate multiple networks 136 or virtual networks 136, which can be internetworked or isolated. These have been omitted for ease of illustration, however it will be understood that the teachings herein can be applied to such systems. Network 136 may be constructed from one or more computer network technologies, such as IEEE 802.3 (Ethernet), IEEE 802.11 and similar technologies.

Computers and computing devices such as user device 102 and server 120 may be connected to network 136 or a portion thereof via suitable network interfaces. In some cases, the user device 102 may connect to server 120 using network 136 via the Internet. In other cases, the user device 102 may be directly linked to server 120, for example, via a Universal Serial Bus, Bluetooth™ or Ethernet connection.

The user device 102 may be a computer such as a desktop or laptop computer, which can connect to network 136 via a wired Ethernet connection or a wireless connection. The user device 102 has a processor 104, a memory 106 that may include volatile memory and non-volatile storage, at least one communication interface 112, input devices 110 such as a keyboard and trackpad, output devices such as a display 108 and speakers, and various other input/output devices as will be appreciated. The user device 102 may also include computing devices such as a smartphone or tablet computer.

Processor 104 is a computer processor, such as a general purpose microprocessor. In some other cases, processor 104 may be a field programmable gate array, application specific integrated circuit, microcontroller, or other suitable computer processor.

Processor 104 is coupled to display 108, which is a suitable display for outputting information and data as needed by various computer programs. In particular, display 108 may display graphical user interfaces (GUI), such as the example user interfaces shown in FIGS. 8A-12 discussed below. The user device 102 may execute an operating system, such as Microsoft Windows™, GNU/Linux, or other suitable operating system.

Communication interface 112 is one or more data network interface, such as an IEEE 802.3 or IEEE 802.11 interface, for communication over a network.

Processor 104 is coupled, via a computer data bus, to memory 106. Memory 106 may include both volatile and non-volatile memory. Non-volatile memory stores computer programs consisting of computer-executable instructions, which may be loaded into volatile memory for execution by processor 104 as needed. It will be understood by those of skill in the art that references herein to user device 102 as carrying out a function or acting in a particular way imply that processor 104 is executing instructions (e.g., a software program/application) stored in memory 106 and possibly transmitting or receiving inputs and outputs via one or more interface. Memory 106 may also store data input to, or output from, processor 104 in the course of executing the computer-executable instructions.

As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

For instance, a document viewing application 114 may be stored on the user device 102. Although shown separately from memory 106, it will be understood that document viewing application 114 may be stored in memory 106. In general, the document viewing application 114 may provide a user of the user device 102 with user interfaces for interacting with and managing storage of documents in relational database 130. The document viewing application 114 may also provide a user of user device 102 with an interface for filtering and navigating the documents stored in relational database 130. While document viewing application 114 is shown as being provided on the user device 102, the document viewing application 114 may be provided as a remote application or interface accessible to the user device 102 over the Internet using network 136. The document viewing application 114 may communicate with a document filtering application 134 of server 120 to assist the server 120 in organizing, managing and filtering documents in the relational database 130.

The server 120 may be a computer such as a desktop or server computer, which can connect to network 136 via a wired Ethernet connection or a wireless connection. The server 120 has a processor 124, a memory 126 that may include volatile memory and non-volatile storage, at least one communication interface 128, a relational document database 130 and a non-relational document association database 132. The processor 124, memory 126, and communication interface 128 may be implemented in generally the same manner as with processor 104, memory 106, and communication interface 112 respectively.

Although shown as separate elements, it will be understood that databases 132 and 134 may be stored in memory 126. Optionally, server 120 may include additional input or output devices, although this is not required. As with all devices shown in system 100, there may be multiple servers 120, although not all are shown. In some cases, server 120 may be distributed over a plurality of computing devices, for instance operating as a cloud server. As with user device 102, references to acts or functions by server 120 imply that processor 124 is executing computer-executable instructions (e.g., a software program) stored in memory 126.

As noted above, memory 126 may also store databases 130 and 132. Database 130 is a relational database used to store documents and characteristics relating to documents, such as entity identifiers and document categories. The documents in relational database 130 may be tagged with one or more entity identifiers.

Data stored in the relational database 130 can be arranged into a file directory system with a plurality of file locations. The file directory system may include a plurality of folder or category levels, with high-level folders having one or more sub-folders that provide for more granular organization of files. Each file location in the plurality of file locations can be associated with a particular folder (and thus a particular folder level), and may also have secondary associations with each of the folders above that folder in a hierarchy. In some cases, these secondary associations may be directly identified in the database 130, while in other cases a document may be assigned to only the folder(s) within which it is stored. The folders and sub-folders may reflect categories and sub-categories used to organize documents.

Database 132 is implemented as a non-relational database to store associations between entity identifiers, documents and categories. Database 132 may also store icon status flags indicating whether a document and/or folder is active. The database 132 can also store document counts for each category/folder.

The non-relational database 132 can be implemented as a graph database where data items are stored in nodes. For instance, the database 132 may include document nodes representing/corresponding to the documents stored in relational database 130. The database 132 may also include category nodes representing/corresponding to the categories/folders defined in the relational database. The database 132 may define edges between the nodes that represent the relationships between the documents and categories, and sub-categories and parent categories. The associations between entity identifiers and documents and entity identifiers and categories can be stored as attributes for the nodes. Similarly, icon status flags and document counts can also be stored as attributes for the relevant nodes.

The user device 102 and document filing server 120 may have various additional components not shown in FIG. 1. For example, additional input or output devices (e.g., keyboard, pointing device, etc.) may be included beyond those shown in FIG. 1.

The server 120 may store a software application referred to herein as a document filtering application 134. Although shown separately from memory 126, it will be understood that document filtering application 134 may be stored in memory 116. The document filtering application 134 may be configured to filter file icons corresponding to the documents and document categories stored in database 130. The document filtering application 134 can use the data stored in non-relational database 132 (such as the entity associations and category associations) to filter file icons.

The document filtering application 134 may also be configured to define and update entity associations between documents and entity identifiers and category associations between entity identifiers and document categories. While document filtering application 134 and document viewing application 114 are shown as separate applications, it will be understood that operations described as being performed by these applications may be performed by a single application operating on either the server 120 or user device 102, or these operations may be distributed between the user device 102 and server 120.

The non-relational database 132 may allow the document filtering application 134 to efficiently manage filtering of documents stored in multiple folder directories in the relational database 130, using the associations stored in the non-relational database 132. When events occur involving the documents, categories, entity identifiers and entity types stored in the relational database 130, such as documents being stored or moved, modifications to category assignments, changes in entity assignments, entities being added or deleted, the document filtering application 134 can trigger updates to the data stored in the non-relational database 132.

Associations within a single hierarchy in the non-relational database 132 can be updated without needing to traverse all the directories in the relational database 130. Similarly, icon statuses and document counts may be inherited within a single hierarchy. This may provide for rapid updates of associations corresponding to multiple directories in the relational database 130, with a reduced computational load. For example, where a graph database 130 is used, an event affecting an individual node can automatically trigger an update to each of the nodes connected thereto by an edge in the graph database 130.

Figure 2:
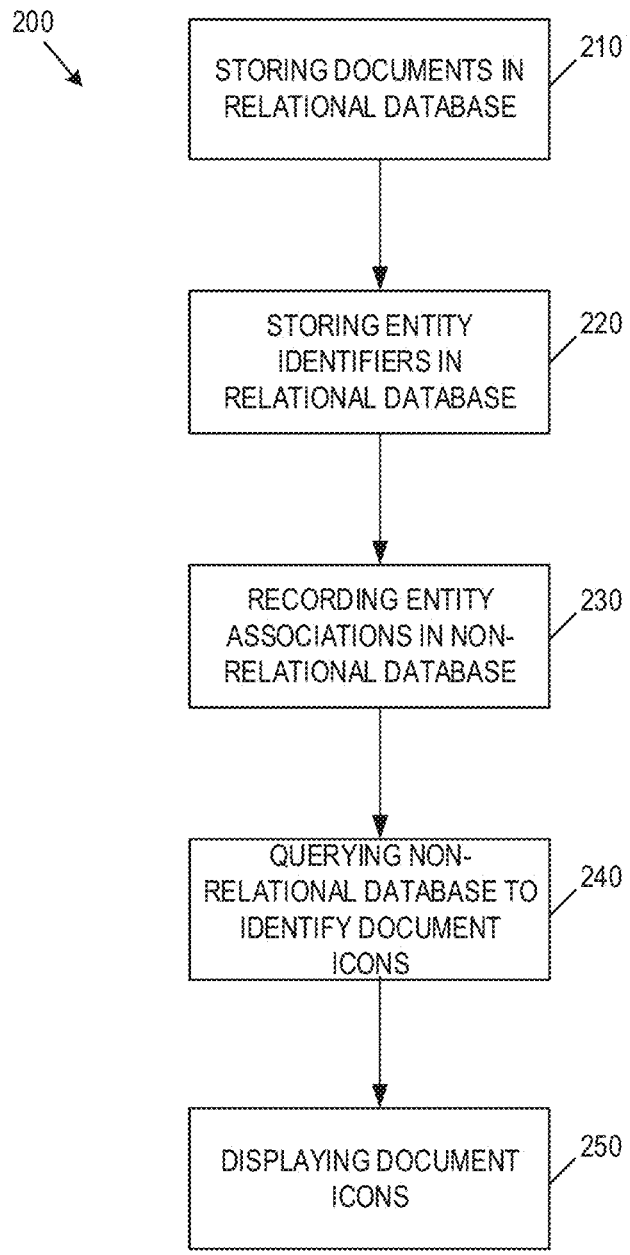
FIG. 2 illustrates a process for filtering and displaying file icons in accordance with an example embodiment.

Referring now to FIG. 2, shown therein is an example embodiment of a process 200 that may be used to filter data relating to a plurality of documents. The process 200 is an example of a process that may be implemented using system 100 to organize and display in real-time data related to a plurality of documents.

At 210, a plurality of documents can be stored in a relational database storage such as relational database 130. The documents may be stored in the relational database 130 in various manners, such as dragged and dropped into an interface of the document viewing application 114, emailed or uploaded to the document filtering application 134, or otherwise transmitted to the document filtering application 134 for storage in relational database 130. The relational database 130 may have a plurality of file directories, and the plurality of documents may be stored in file locations spread across the file directories.

At 220, a plurality of entity identifiers can be stored in the relational database storage. An entity identifier generally refers to a group or individual or organization for which documents may be stored in relational database 130. The entity identifiers may be defined by a user through the document viewing application 114 or other application interfacing with document filtering application 134. Examples of entities may include one or more individuals, businesses, partnerships and the likes, some examples of which are shown in FIGS. 8D and 9B described below.

Each of the plurality of entity identifiers can have an associated entity type selected from a plurality of entity types. The entity types may refer to the sort or kind of entity for which documents may be stored. Examples of entity types may include a sole proprietorship entity type, a partnership entity type, a person entity type, a corporation entity type, a cooperative entity type, a charitable foundation entity type, a family trust entity type, a limited liability corporation entity type. Some examples of entity types are shown in FIG. 8C, described below.

At 230, a plurality of entity associations between the plurality of entity identifiers and the plurality of documents are recorded in a non-relational database storage. The entity associations can be stored in a database such as the non-relational database 132.

Each entity association includes/indicates a relationship between one or more entity identifier from the plurality of entity identifiers and a selected document in the plurality of documents. Entity associations reflect the entity or entities a user has associated with each document. For example, document nodes may be stored in a graph database corresponding to each of the documents stored in the relational database. The entity associations for each document may then be defined as an attribute for the corresponding document node.

The entity associations can be defined by a user for each document for instance using the document viewing application 114. In some cases, a user may define entity associations for a plurality or batch of documents simultaneously. A user can define an entity association by tagging a document in the relational database 130 with a particular entity identifier. When a document is stored in the relational database 130, the document filtering application 134 may prompt the user to tag that document with an entity identifier. A user may also subsequently modify the entity identifiers with which a document is tagged as desired. When the entity tags are modified, updates to the entity associations in the non-relational database can be triggered.

Documents may have one or more entity associations. For example, an individual's monthly bank statement may be associated only with an entity identifier for that individual. A pay stub reflecting salary paid to an individual from a professional corporation may be associated with both an entity identifier for the individual and an entity identifier for the professional corporation. Accordingly, where the non-relational database stores document nodes, the attributes for the pay stub node may be defined to include both entity identifiers.

At 240, a selection of documents from the plurality of documents stored in the relational database 130 can be determined by querying the non-relational database 132 using at least one currently selected entity identifier. When interacting with the document viewing application 114, a user may select one or more entity identifiers for viewing documents associated with those entities. To determine the documents stored in the relational database 130 that are associated with the selected entity identifiers, the non-relational database 132 can be queried using the selected entity identifiers. For instance, the selection of a filter may be an event triggering an update to the icon status (e.g. an icon status flag or attribute) of each document/category represented in the non-relational database 132.

At 250, a plurality of file icons can be displayed in a display interface of the document viewing application 114, for example using display 108. The plurality of file icons generally includes active icons that correspond to the selection of documents determined at 240. In some cases, the plurality of file icons displayed may only include only the active icons corresponding to the determined selection of the plurality of documents from 240. Active file icons refer to document icons and category icons for document and categories associated with the currently-selected entities.

For example, a user may wish to view only files and folders that contain documents for the currently selected entity identifiers. In such cases, only those file icons (i.e. folder icons, document icons) that are active (i.e. correspond to the currently selected entities) and have a non-zero document count (i.e. are not empty) may be displayed to a user. In other cases, a user may wish to view all the files and folders that may be associated with the currently-selected entity. For instance, a user may be interested in learning about the other categories and sub-categories that may be available for storing documents to facilitate subsequent file storage and management. In some cases, a hidden document indication may also be displayed to a user to indicate that documents associated with other entities (i.e. not the currently-selected entity identifier) may be present within a category or a nested sub-category.

Figure 4:
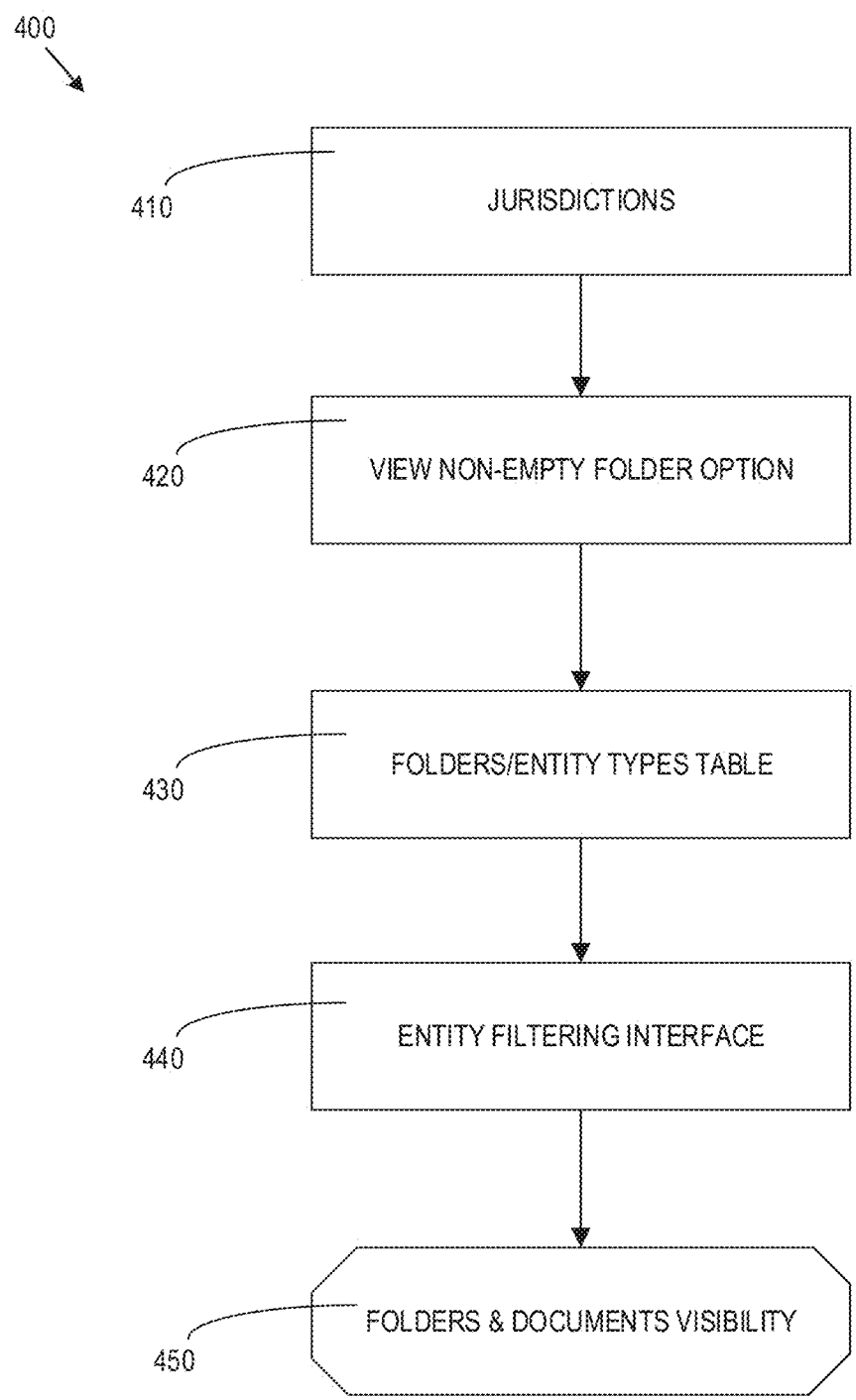
FIG. 4 illustrates an example hierarchy of filters in accordance with an example embodiment.

As shown in FIG. 4, discussed below, a plurality of filters may be applied to determine the plurality of documents icons that are displayed. FIGS. 7A-7D also illustrate examples of how different file icons may be displayed when active icons are filtered using entity identifiers.

Figure 3:
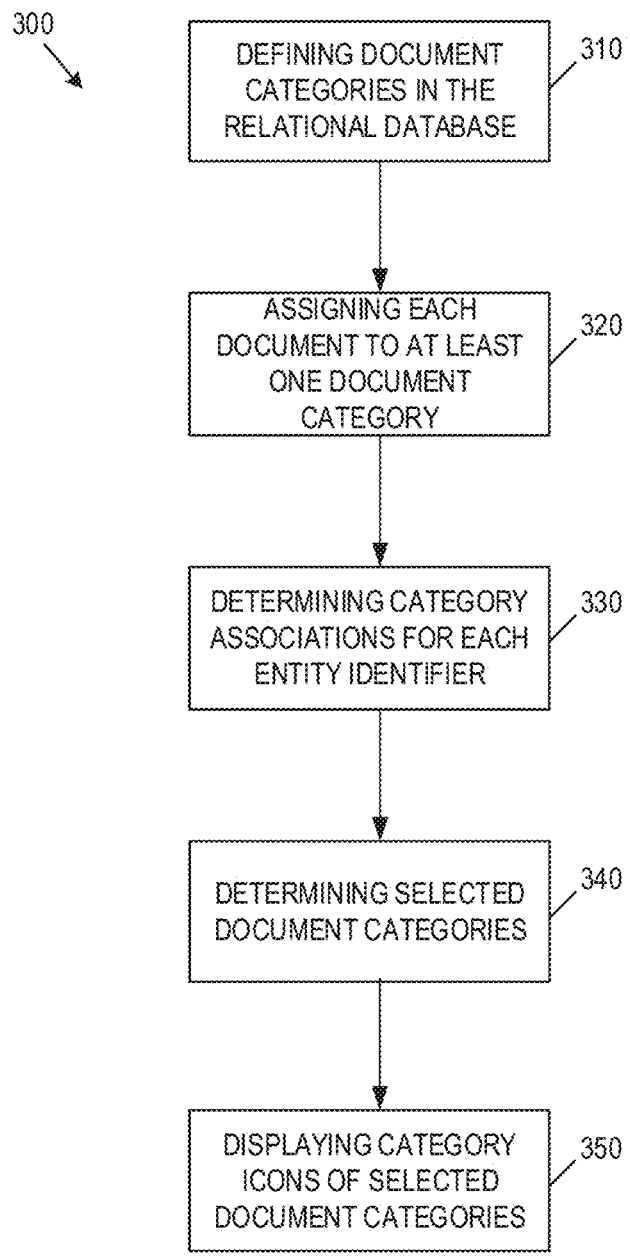
FIG. 3 illustrates a process for filtering and displaying category icons in accordance with an example embodiment.

Referring now to FIG. 3, shown therein is an example embodiment of a process for filtering and displaying category icons in accordance with an example.

At 310, a plurality of document categories can be defined in the relational database storage. The plurality of document categories may be used to file documents within classes or groupings based on the document content. For instance, the document categories may include a banking category, an accounting category, an insurance category and so on.

The plurality of document categories may include a category hierarchy. The category hierarchy may include at least one parent category and at least one sub-category nested within each parent category. The category hierarchy may include a plurality of category levels with multiple levels of sub-categories nested within one another, each in turn nested within a parent category.

Figure 13:
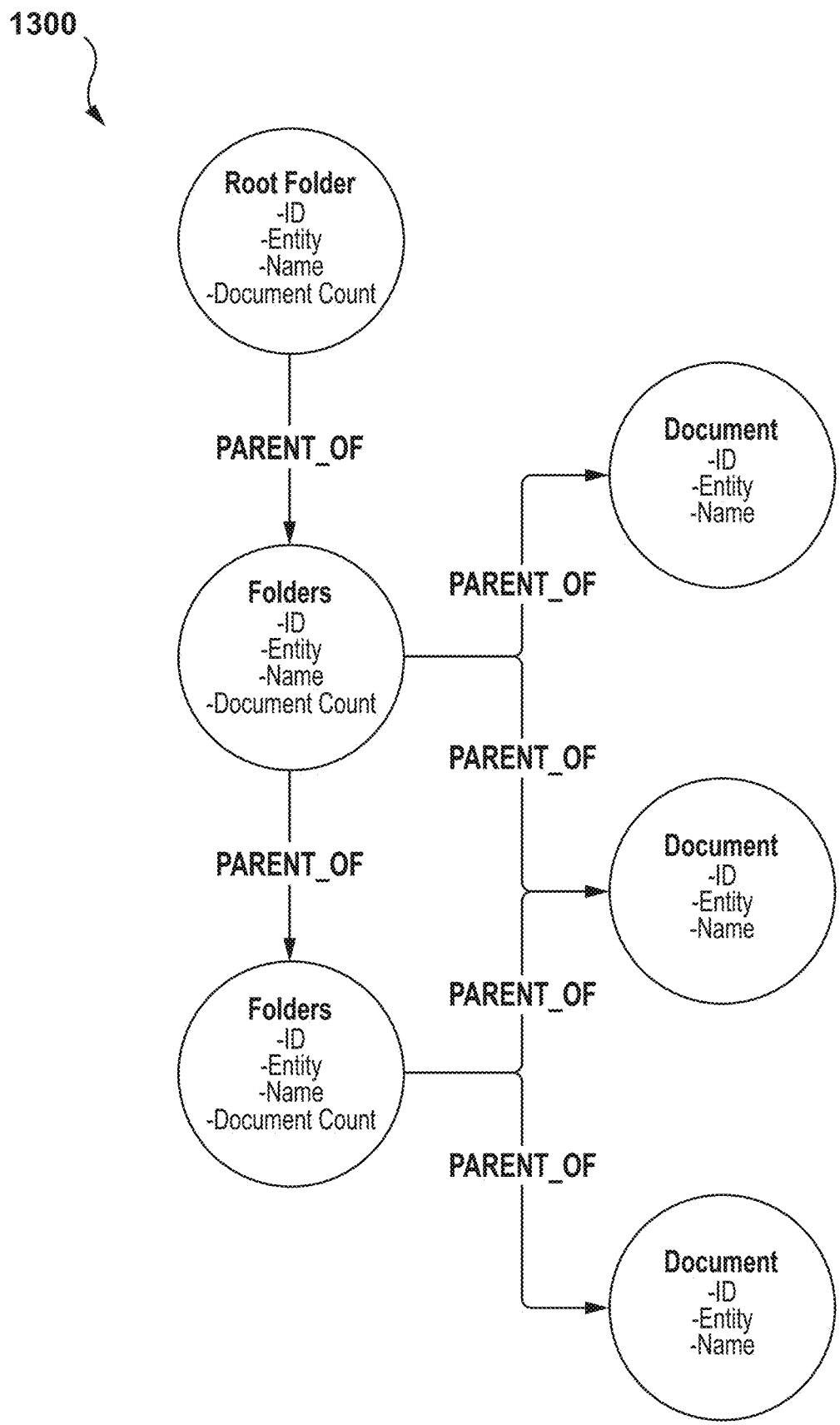
FIG. 13 illustrates an example non-relational database structure that may be used in the system of FIG. 1 in accordance with an example embodiment.

The categories can be defined in the non-relational database as category nodes. The category hierarchy can then be defined as relations/edges between the category nodes in the database. Document nodes and their relations with category nodes can be similarly defined. An example implementation of the relations/edges between category nodes and other category nodes and document nodes is shown in FIG. 13 discussed below.

At 320, each document in the plurality of documents can be assigned to at least one of the document categories. A document may be assigned to a category by being moved to or stored in the category folder corresponding to that document category. In some cases, a document may be assigned to multiple document categories, for example where the document is stored in multiple file locations in the relational database 130.

At 330, a plurality of category associations between the plurality of entity identifiers and the plurality of document categories can be stored in the non-relational database 132. Each category association indicates or represents a category relationship between a selected category in the plurality of document categories and one or more entity identifiers.

Category associations may be determined based on default category associations defined for entity types. Each entity type may have a set of default category associations. The category associations for a particular category can be determined using the default category associations. FIG. 8C illustrates an example user interface showing how default category associations may be defined for entity types.

Category associations may be defined or updated in response to event triggers. When an association update is triggered, the category associations for each parent category can inherit the updated category associations for each of the sub-categories nested within that parent category. Examples of event triggers are discussed in further detail below with reference to FIG. 5.

At 340, a selected plurality of document categories may be determined by querying the plurality of category associations in the non-relational database using the at least one currently-selected entity identifier. The selected plurality of document categories are generally those associated with the entity identifier(s) that a user has selected.

As shown in FIG. 4, discussed below, a plurality of filters may be applied to determine the selected plurality of document categories. For example, a user may select a hide empty folder filter when they wish to only view category icons corresponding to document categories having documents stored therein that relate to the currently-selected entity identifiers. In such cases, the selected plurality of document categories may be determined to only include document categories having an active icon status. The active icon status for a document category (and a document) may be determined using flags stored in the non-relational database 132 for each document category (and document) that can be updated based on events and the user-selected filters. The selection of a filter may also be an event that triggers an update to data in the non-relational database. For example, modifying the currently-selected entity identifier(s) can trigger an update to icon statuses for documents/categories associated with the entity identifier that is selected or unselected.

In some cases, the selected plurality of document categories may be determined to include all of the document categories associated with the entity type(s) of each of the at least one currently-selected entity identifiers. That is, a user may select to include document categories that may be empty, but that are associated with the entity type of the selected entity identifiers, e.g. by default category associations. This may help the user to identify other document categories that they may subsequently use for filing documents.

At 350, the plurality of file icons displayed by the user device 102 may include a plurality of category icons corresponding to the selected plurality of document categories determined at 340. As discussed above, the selected plurality of document categories (corresponding to the plurality of file icons) may only include document categories having an active icon status in some cases. In other cases, the selected plurality of document categories (corresponding to the plurality of file icons) may include all document categories corresponding to the selected entity or entities.

An icon status may be stored in the non-relational database 132 for each of the document categories in the plurality of document categories. The icon status may be a flag indicating whether the document category is currently active or inactive. In general, an active flag or active icon status indicates that at least one of the documents in the selection of the plurality of documents (i.e. one of the documents associated with the currently-selected entity) is assigned to the corresponding document category (or a nested sub-category). An inactive flag or inactive icon status may indicate that none of the documents in the selection of the plurality of documents is assigned to the corresponding document category (or any nested sub-category).

The icon status or icon flag in the non-relational database for each parent category may be determined by inheriting the icon status of each sub-category nested within that parent category. An inherited active icon status may be generally dominant over any inherited inactive icon statuses. That is, if a parent category inherits one or more inactive icon statuses, the parent category's icon status may still be determined to be active if an active icon status is inherited from any nested sub-category. A category's icon status may also be determined to be an active icon status if any currently selected documents are stored directly within that category (regardless of the inherited icon status).

The plurality of file icons displayed to a user may only include the active document icons corresponding to the determined selection of the plurality of documents. The document filtering application 134 may determine the active document icons using the icon status/icon flag of the each category and document. The icon flag of each category and document can be determined in response to entity filters applied by a user, e.g. by querying entity associations using the selected entity identifiers.

A document count may also be stored in the non-relational database 132 for each document category. The document count for each document category indicates the number of documents in the selection of the plurality of documents assigned to that document category. The document count may be displayed to a user to provide a quick indication of how many documents stored are within that category folder and its nested sub-folders. The document count in the non-relational database 132 for each parent category can be determined by inheriting and adding the document count from each sub-category nested within that parent category. A category's document count may be determined taking into account only documents having an active icon status/active icon flag indicating that the documents are associated with the currently selected entity identifier(s).

Referring now to FIG. 4, shown therein is an example hierarchy 400 of filters that may be applied to determine the file icons to display to a user in accordance with an example embodiment. In some cases, the operation of the filters 410-440 may be logically applied in order of the hierarchy 400 (i.e. from 410-440). The selection of a filter by a user may trigger an update to the data in the non-relational database. For instance, a jurisdiction filter 410 may be applied to select document icons and category icons for a particular jurisdiction. A user may apply a jurisdiction filter using a user interface such as user interface 800A shown in FIG. 8A.

A hide empty folder filter 420 may be used to display only categories or folders containing at least one document. A user may apply an empty folder filter using a user interface such as user interface 800B shown in FIG. 8B. In some cases, a user may choose not to filter empty folders, and empty categories associated with the current entity identifier(s) may be displayed to the user. In such cases, the category icons corresponding to empty categories may be modified (e.g. faded) to indicate that the category is empty or inactive. Alternatively, a "show active folders" filter may be applied so that only categories having documents with an active icon status nested therein are displayed.

A default folder category filter 430 may be used to define default category associations to be displayed for particular entity types. These default category associations may be defined by a user interacting with a user interface such as user interface 800C, shown in FIG. 8C. If a user chooses not to filter empty folders, the default category associations may be used to determine the additional category icons to display that are in addition to categories having documents stored therein that are associated with the currently-selected entity identifier(s).

An entity filter 440 can be used by a user to select those entity identifiers for which documents are to be displayed. A user may interact with an entity filter, for example using user interface 800D, shown in FIG. 8D. The entity filter allows the user to select one or more entity identifiers that can be used to query the non-relational database to identifier entity associations, category associations, active icon statuses, and documents counts. Documents and document categories not associated with the currently-selected entity identifiers may then be hidden.

Each of the filters 410-440 can be applied to modify the visibility 450 of file icons such as document icons and category icons.

Figure 5:
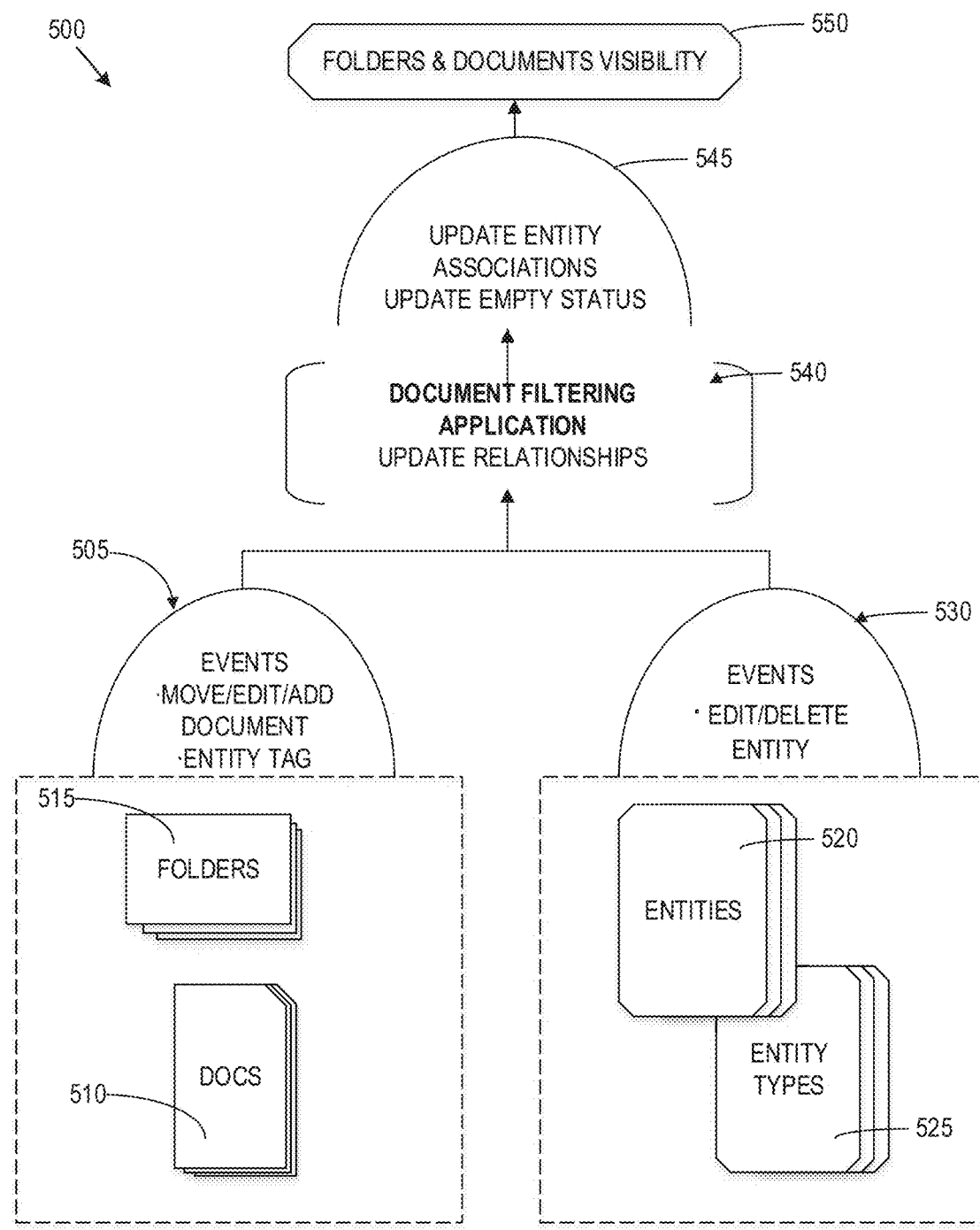
FIG. 5 illustrates a flowchart of an example process for updating icon status in accordance with an example embodiment.

Referring now to FIG. 5, shown therein is an example flowchart of a process 500 for triggering updates to entity associations and category associations in response to events 505 and 530.

Update triggering events can include document events 505 relating to documents 510 stored in relational database 130 or new documents 510 being stored therein. Document events 505 may include deleting a document 510, moving a document 510, adding a document 510, tagging a document 510 with an entity identifier and untagging an entity identifier from a document 510. Updated triggering events can also include entity events 530 relating to the entity identifiers stored in the relation database 130. Entity events may include adding an entity identifier 520, deleting an entity identifier 520, changing the entity type 525 of an entity identifier 520, and changing default category associations for entity types 525.

The document filtering application 134 may detect at 540 an update triggering event in the relational database 130. In response, the document filtering application 134 can trigger at 545 an update to entity associations, category associations, document counts and/or icon statuses in the non-relational database 132, for instance using the automatic inheritance methods described herein. The updated entity associations, category associations, document counts and/or icon statuses may then be used at 550 to update (if necessary) the file icons displayed to a user.

For example, a document event may include storing an additional document in the relational database storage. The newly stored document may be associated with a first document category. The user may also tag the document with one or more entity identifiers. The document filtering application 134 may trigger an update to the entity associations and/or category associations in the non-relation database 132.

An additional entity association may be defined in the non-relational database 132 as a relationship between the additional document and a particular entity identifier (e.g. the tagged entity identifier). In some cases, the particular entity identifier may not have a category association with the first document category. Accordingly, the category associations in the non-relational database storage for the first document category can be updated to include the particular entity identifier. Similarly, the category associations for categories in which that first document category is nested can automatically be updated to inherit the new category association(s). Each of the categories above that document in a category path may have their category associations updated automatically to include the particular entity identifier.

A document event may also include modifying an entity identifier associated with a document in the relational database 130. For example, a user may tag or untag an entity identifier to/from a particular document. The document filtering application 134 may trigger an update to the entity associations for that document stored in the non-relational database 132. Similarly, an update to the category associations for each of the document categories to which that document was assigned can be triggered based on the modified entity association for that document.

Depending on the particular update triggering event, one or more category tree updates may be required. For example, when an entity tag is removed from a document, to update the category associations for each category association tree to which that document is assigns may include determining whether any documents at the same level or sub-categories nested below have an entity association that includes the entity being removed. If such a document or sub-category is identified, the category associations would not need to be updated as the category would still contain a document associated with that entity. If no such document or sub-category is identified, the category association for the category in which the document was stored can be updated to remove that entity identifier from the category associations. A similar process may occur when a document is deleted, or is removed from a document category, where the category path above is updated.

To determine if the parent category's category associations need be updated, the other sub-categories at the same level (if there are any) may be queried to determine if a category association with the entity identifier being removed is present. If one is identified, the queries may stop and the parent category associations need not be updated, otherwise the parent category associations may be updated to remove the entity identifier. This process may automatically continue for each category level, until the entity identifier is present is an entity association, or all potentially effected categories have been queried.

As mentioned, depending on the triggering event, the number of category paths in the non-relational database that may need to be updated can vary. For example, uploading or storing a new document in a document category can trigger an update to the category associations in the category path including that document category and the document categories above (i.e. in which that category is nested). Similarly, where a document is added to an additional category an update to the category associations in the category path including that document category and the document categories above can be triggered. Moving a document from a first document category to a second document category (i.e. removing the document from the first category and storing the document in the second category) can trigger an update to a first category path including the first category and categories above, as well as a second category path including the second category and categories above.

When a document is tagged with a new entity identifier, an update can be triggered for the category path including and above each of the categories associated with that document. Similarly, when an entity identifier tag is removed from a document, an update can be triggered for the category path including and above each of the categories associated with that document.

When an entity identifier is deleted, updates to the entity associations and category associations for each document and category associated with that entity can be triggered. A user may also be prompted to tag some documents with a new entity identifier. For example, deleting an entity identifier may result in one or more documents being untagged to any entity identifiers. Accordingly, a user may be prompted to tag those documents with an entity identifier. The corresponding updates to the non-relational database can subsequently be triggered when those documents are tagged.

When a document category folder is moved from a first parent category to a second parent category, updates can be triggered for the category paths including both the first parent category and the second parent category. Deleting a document category folder can then trigger an update for the category path above that category.

Figure 6A:
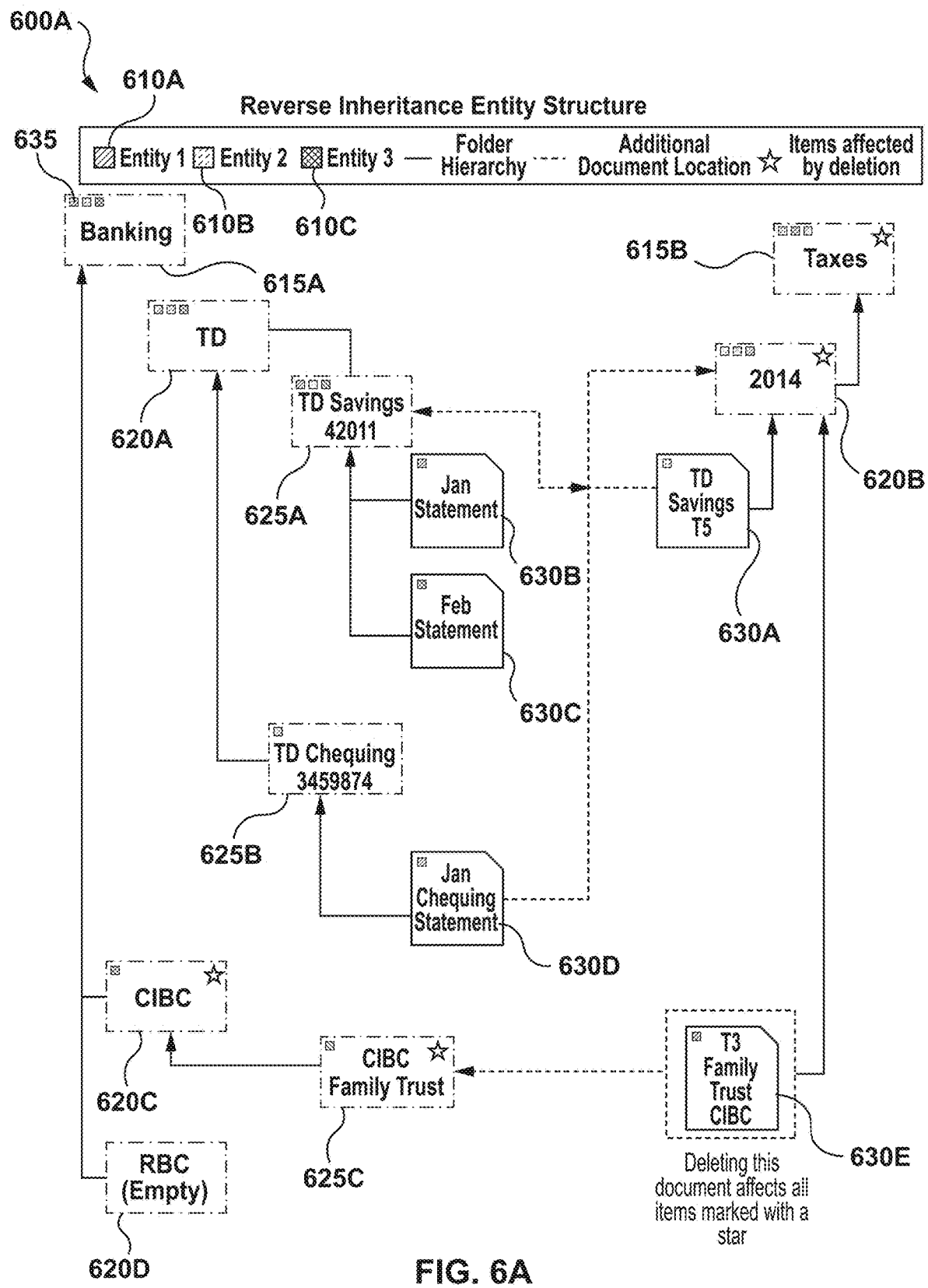
FIGS. 6A-6B illustrate an example of updating document entity associations in accordance with an example embodiment.

Referring now to FIG. 6A, shown therein is a flowchart 600 illustrating a plurality of folders including category folders 615A-B, first level sub-category folders 620A-D, and second level sub-category folders 625A-C. A plurality of documents 630A-630E are stored in one or more folders in the flowchart 600. FIG. 6A illustrates the relationships between various categories and sub-categories, as well as the documents stored therein.

Each of the category folders 615A-B, first level sub-category folders 620A-D, and second level sub-category folders 625A-C may have category associations stored in the non-relational database 132 indicating a relationship between that category and one or more entity identifiers 610A-6100. As shown in FIG. 6A, the entity identifiers in those category associations may be denoted at 635.

Figure 6B:
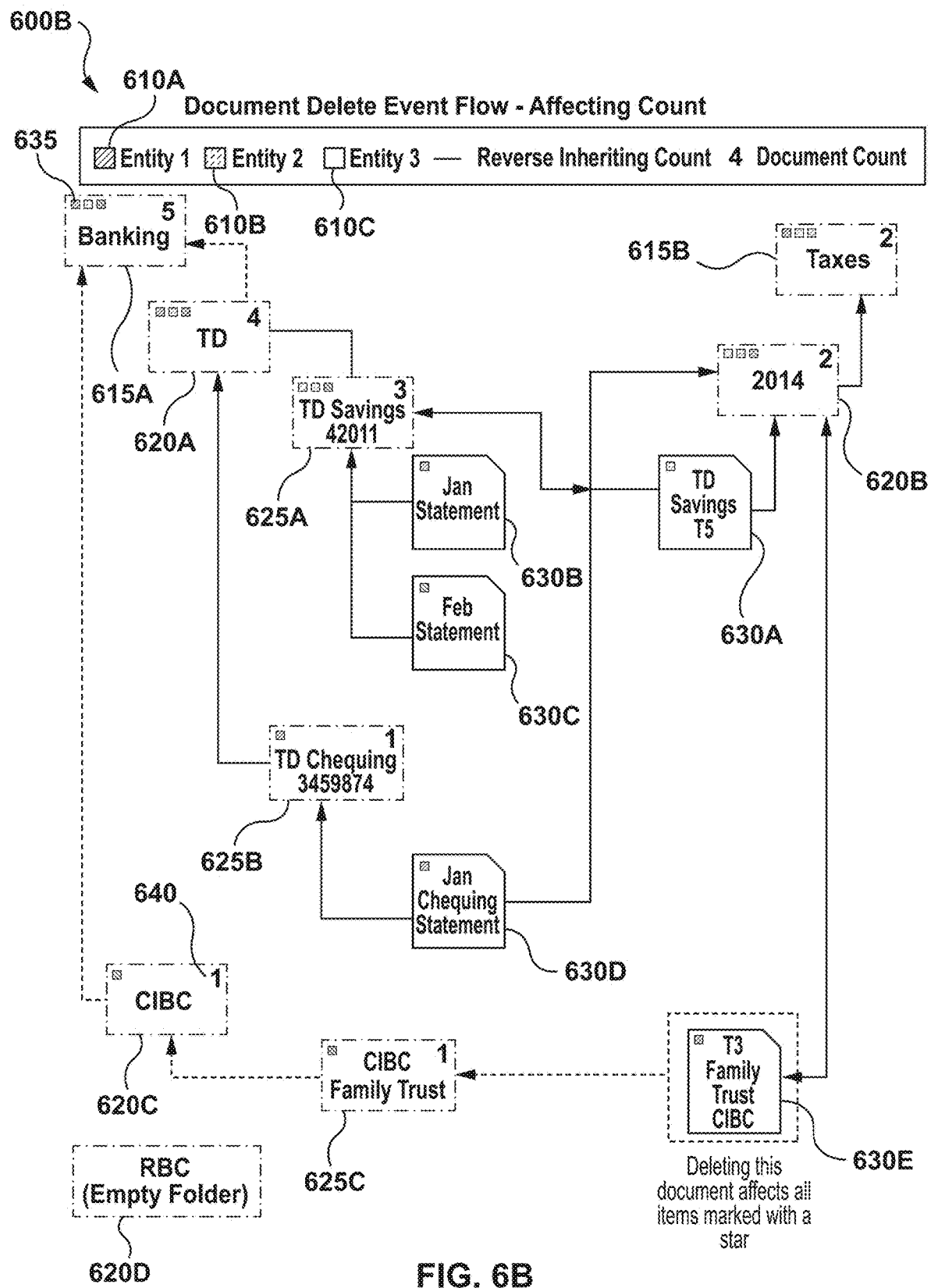

Referring now to FIG. 6B, shown therein is another flowchart 600B illustrating an example of the effects of deleting a document 630E. When document 630E is deleted in the relational database 130, the document filtering application 134 can trigger an update to the category paths of the document categories in which that document is stored.

As a result, the category associations for sub-category folder 625C and sub-category folder 620C can be automatically updated to remove associations with the entity identifier 610C. Similarly, the document count 640 for sub-category folder 625C and sub-category folder 620C, and for category folder 615A can be automatically updated to decrease by 1. A potential update to category associations for category 615A may require sub-category 620A to be queried to determine if category 615A should still have a category association with the entity identifier 610C. Because the sub-category 620A has a category association with the entity identifier 610C (inherited from document 630C stored in category 625A), the category associations for category 615A need not be updated. Updates to the category associations and documents counts for category 615B and sub-category 620B can also be triggered, as the document 630E also has a relationship with sub-category 620B.

Figure 7A:
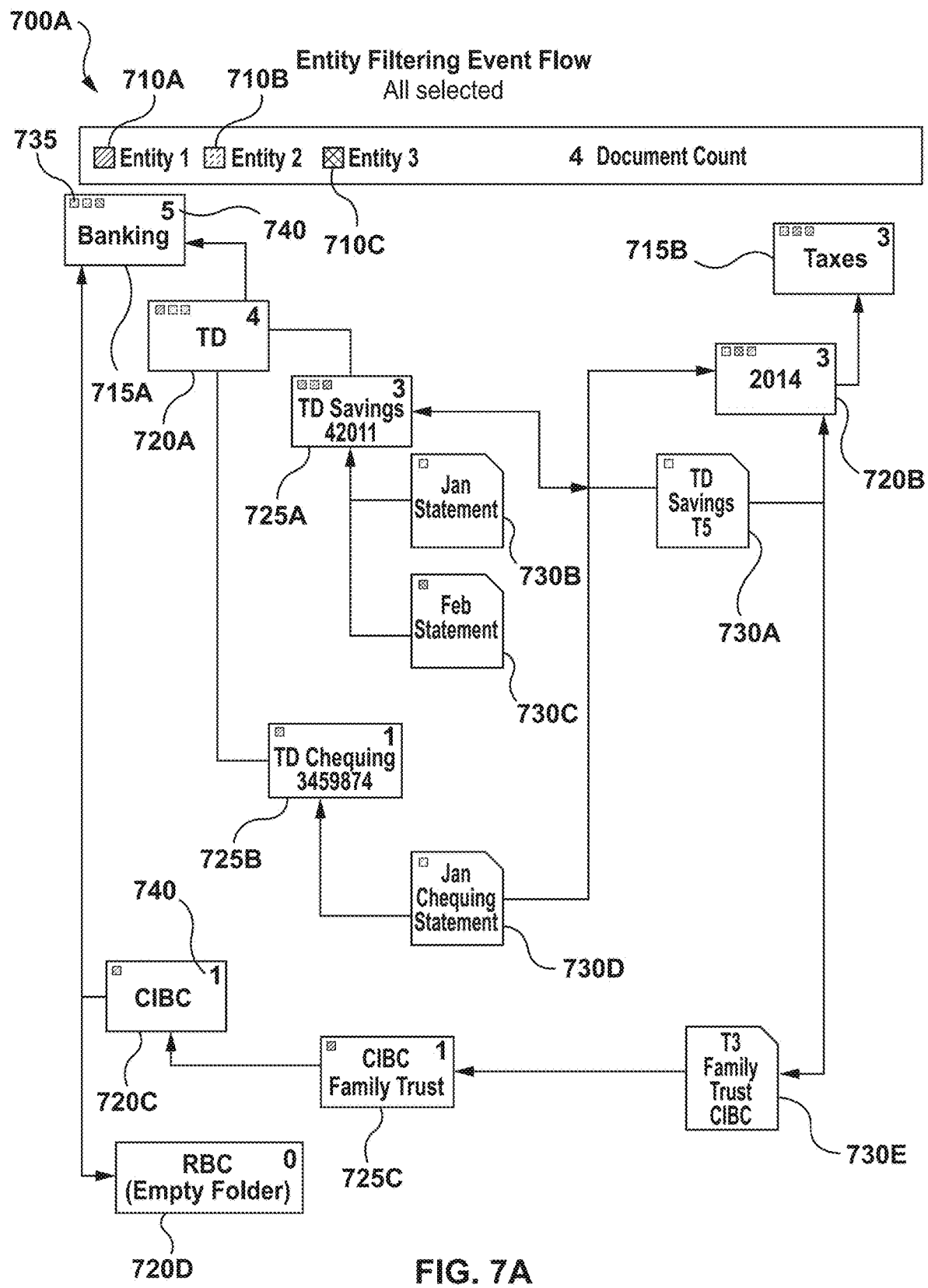
FIGS. 7A-7D illustrate examples of filtering file icons using entity associations in accordance with an example embodiment.

Referring now to FIGS. 7A-7D, shown therein are a series of flowcharts 700A-700D illustrating folder icons that may be displayed when different entity filters are applied. In FIG. 7A, the flowchart 700A shows illustrating a plurality of folders including category folders 715A-B, first level sub-category folders 720A-D, and second level sub-category folders 725A-C. A plurality of documents 730A-730E are stored in one or more folders in the flowchart 700.

Each of the category folders 715A-B, first level sub-category folders 720A-D, and second level sub-category folders 725A-C may have category associations stored in the non-relational database 132 indicating a relationship between that category and one or more entity identifiers 710A-7100. As shown in FIG. 7A, the entity identifiers in those category associations may be denoted at 735.

In FIG. 7A, a user has selected each of entity identifiers 710A, 710B and 710C. Accordingly, the document counts 740 for each of the category folders 715A-B, first level sub-category folders 720A-D, and second level sub-category folders 725A-C include all the documents 730A-730E associated with entity identifiers 710A-710C. Similarly, the icon status for each of the category folders 715A-B, first level sub-category folders 720A-D, and second level sub-category folders 725A-C, and documents 730A-730E can be an active icon status. When a user selects or deselects an entity identifier, the visibility (i.e. icon status) of empty categories and subcategories and document counts can be automatically updated.

Figure 7B:
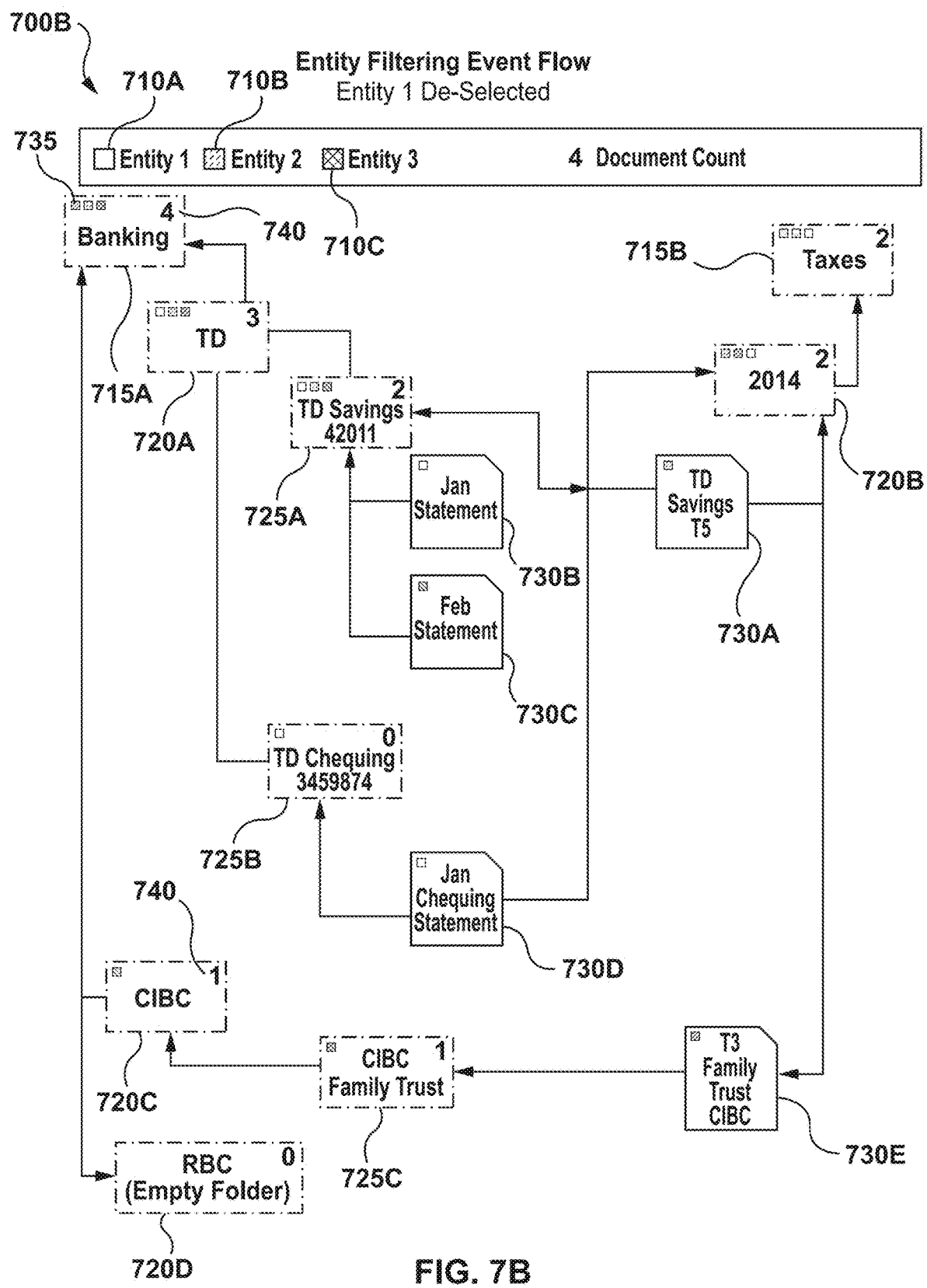

In FIG. 7B, the first entity identifier 710A has been deselected by the user. As the entity associations of documents 730B and 730D do not include any active entity identifiers, the icon status for these documents is inactive. Similarly, the document counts for the sub-categories (725A, 725B, 720A, 720B) and categories (715A and 715B) in the category paths above these documents is automatically decreased. Sub-category 725B is also now inactive, while the other sub-categories 725A, 720A, 720B and categories 715A and 715B remain active because there are other documents nested within those categories that have entity associations that include the currently-selected entity identifiers. The icons displayed to the user can be updated accordingly, as with the document counts displayed.

Figure 7C:
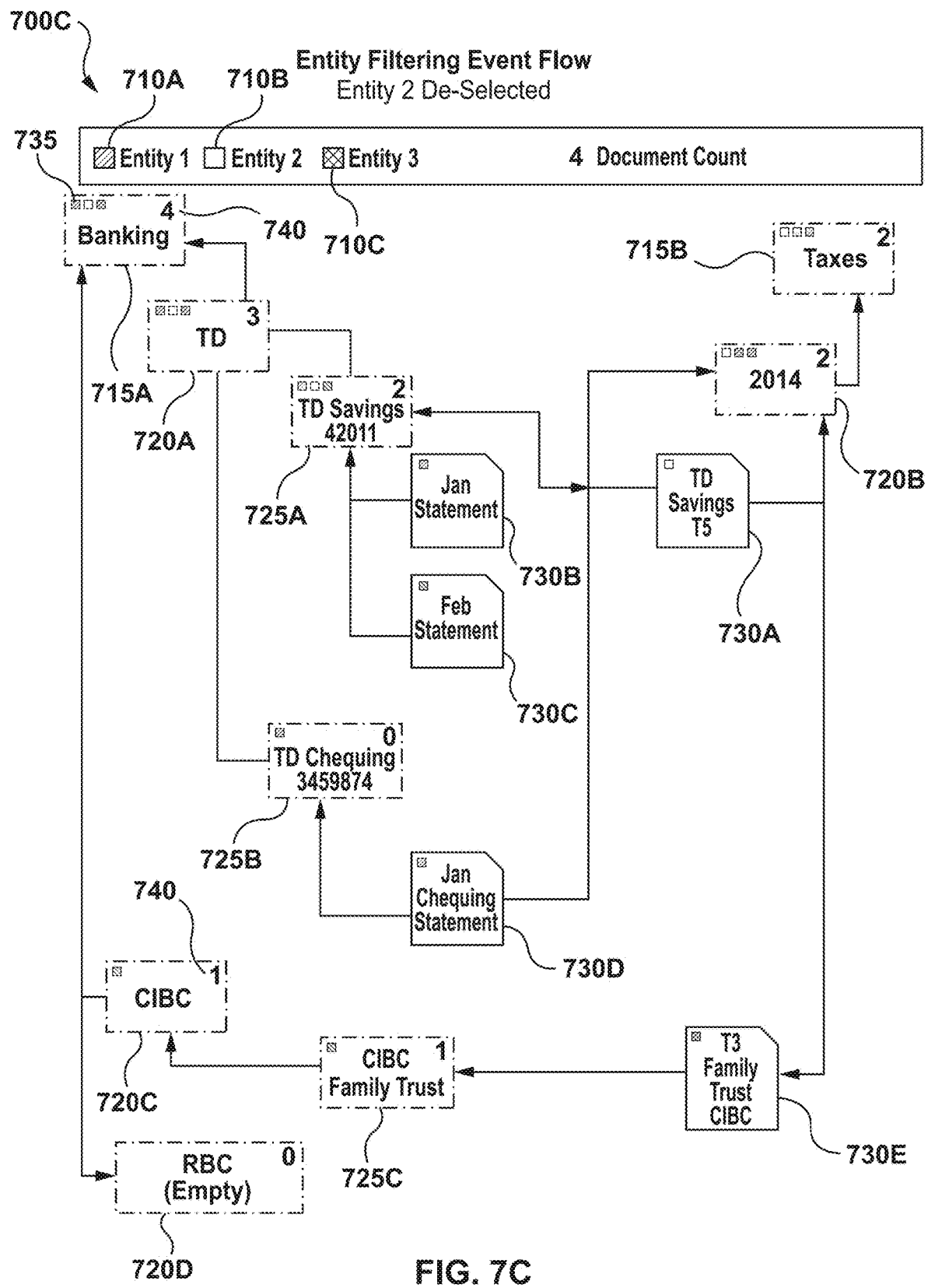

In FIG. 7C, the second entity identifier 710B has been deselected by the user while the first entity identifier 710A and third entity identifier 710C are selected. As the entity associations of document 730A do not include any active entity identifiers, the icon status for document 730A is updated to inactive. Similarly, the document counts for the sub-categories (725A, 720A) and categories (715A and 715B) in the category paths above document 730A are automatically updated. Sub-categories 725A, 720A, 720B and categories 715A and 715B remain active because there are other documents nested within those categories that have entity associations that include the currently-selected entity identifiers. The icons displayed to the user can be updated accordingly, as with the document counts.

Figure 7D:
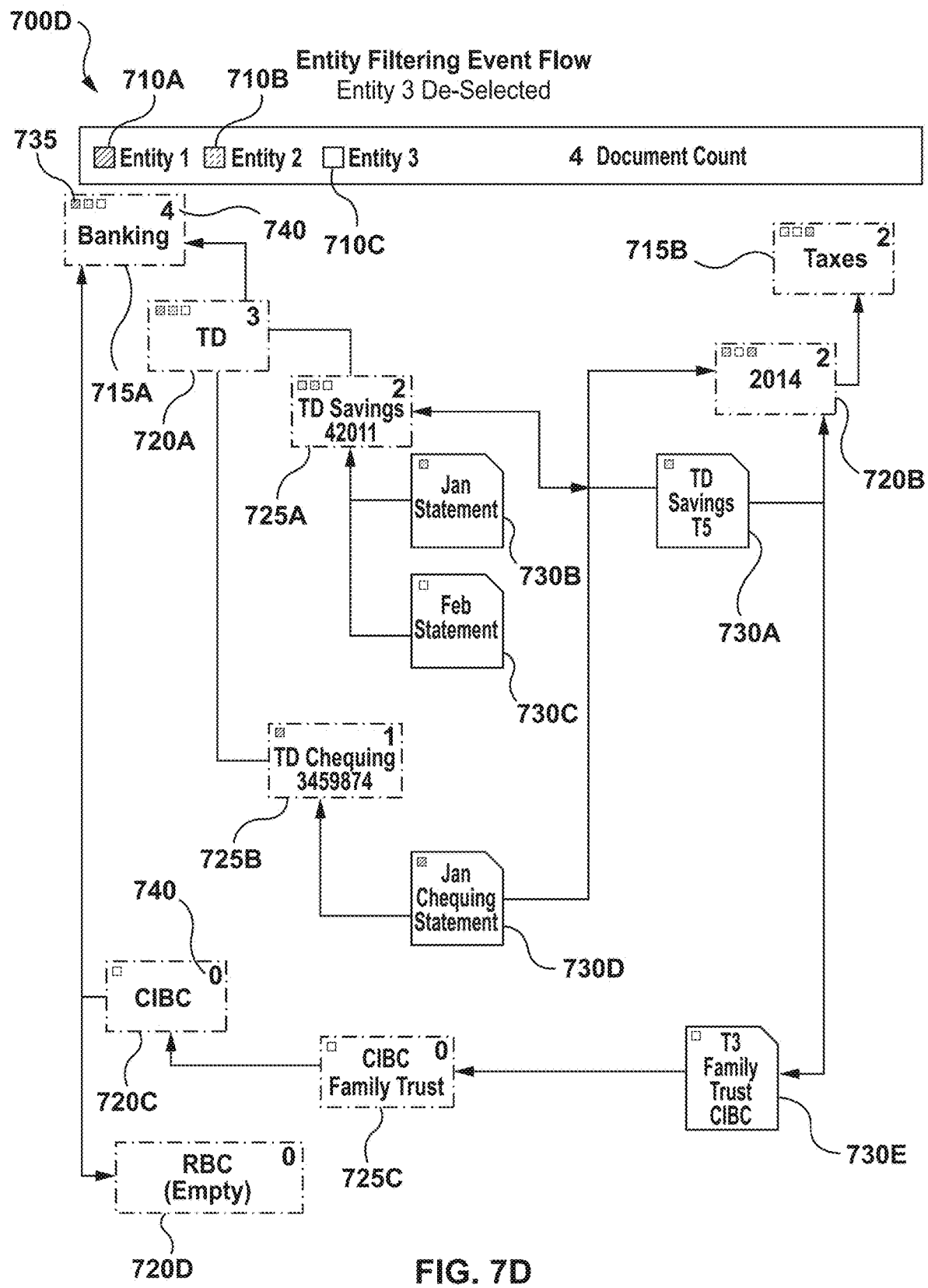

In FIG. 7D, the third entity identifier 710C has been deselected by the user while the first entity identifier 710A and second entity identifier 710B are selected. As the entity associations of documents 730C and 730E do not include any active entity identifiers, the icon statuses for documents 730C and 730E are updated to inactive. Similarly, the document counts for the sub-categories (725A, 725C, 720A, 720B and 720C) and categories (715A and 715B) in the category paths above documents 730C and 730E are automatically updated. Sub-categories 725A, 720A, 720B, 720C and categories 715A and 715B remain active because there are other documents nested within those categories that have entity associations that include the currently-selected entity identifiers. Sub-categories 725C and 720C are now inactive. The icons displayed to the user can be updated accordingly, as with the document counts.

Figure 8A:
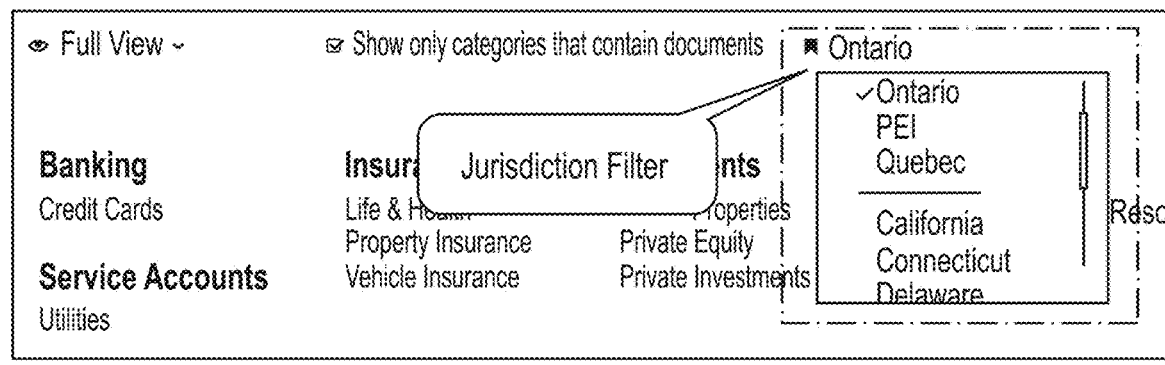
FIG. 8A illustrates a screenshot of an example user interface for filtering file icons by jurisdiction in accordance with an example embodiment.

Referring now to FIG. 8A, shown therein is an example user interface 800A that may be presented to a user, for instance by document viewing application 114. User interface 800A illustrates an interface for selecting a jurisdiction filter. A user may select one or more jurisdictions, and a set of jurisdiction based categories and subcategories are displayed based on the selected jurisdiction may be displayed based on the selected jurisdiction(s). The set of jurisdiction based categories may include categories more likely to be present in that jurisdiction, such as government health-card related forms in Canadian jurisdictions.

Figure 8B:
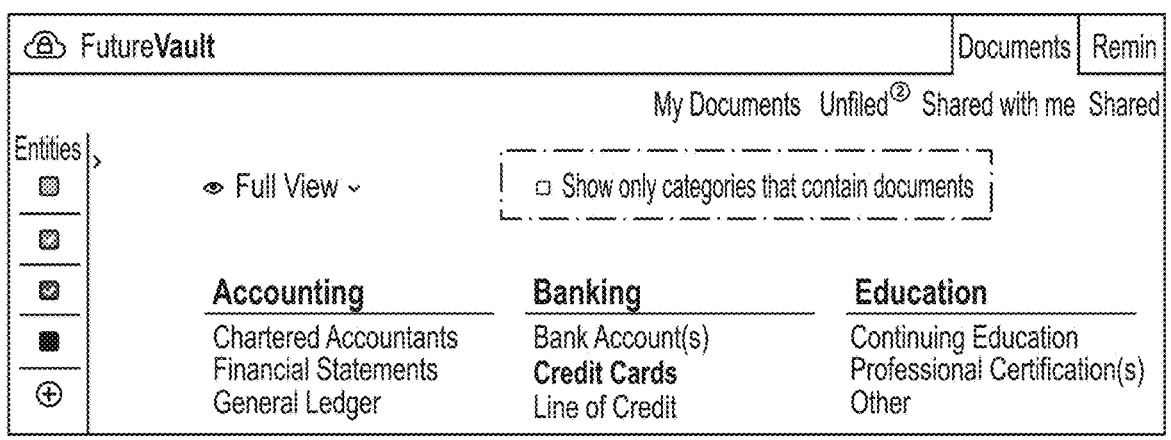
FIG. 8B illustrates a screenshot of an example user interface for filtering file icons by folder status in accordance with an example embodiment.
Figures 8C, 8D:
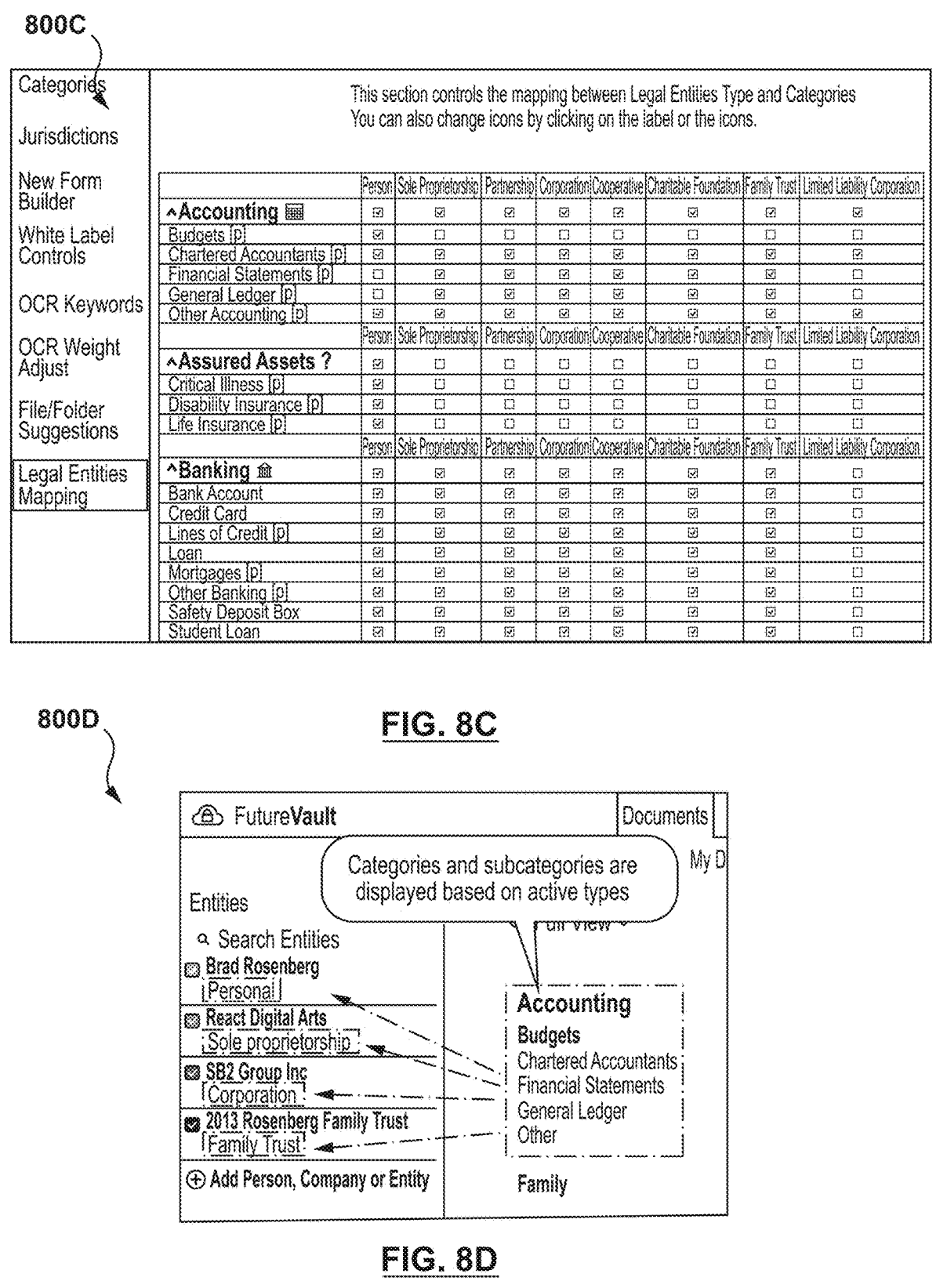

Referring now to FIG. 8B shown therein is an example user interface 800B that may be presented to a user, for instance by document viewing application 114. User interface 800B illustrates an example interface that allows a user to select whether to hide empty categories and sub-categories. A user may select a hide empty categories (or show empty categories) option, and the document filtering application 134 may determine the plurality of category icons to display using the active icon status/flags stored in the non-relational database 132. A parent category with an inactive icon status may be hidden, and the sub-categories nested below may then be automatically hidden without requiring the icon status to be determined (since it was already inherited to the parent category).

Referring now to FIG. 8C, shown therein is an example user interface 800C that may be presented to a user, for instance by document viewing application 114. User interface 800C illustrates how a user may define default relationships between entity types (e.g. person, sole proprietorship, partnership, corporation etc.) and categories (e.g. accounting, banking etc.) and sub-categories (e.g. budgets, financial statements, general ledger). These default relationships can be used to define default category associations for these categories and sub-categories based on the entity types of various entity identifiers. In some cases, these default entity type relationships may be pre-defined in document filtering application 134.

The default category associations may be used to determine category icons to display to a user, for instance where a user selects to view empty folders as well as active folders. The category associations for a particular category may be modified from the default category associations, for example where a document assigned to one of those categories is tagged with an entity of an entity type that does not have a default relationship with that category.

Referring now to FIG. 8D, shown therein is an example user interface 800D that may be presented to a user, for instance by document viewing application 114. User interface 800D illustrates how a user may select or deselect one or more entity identifiers to filter the document icons and category icons to be displayed to that user, as discussed herein above.

Figure 9A:
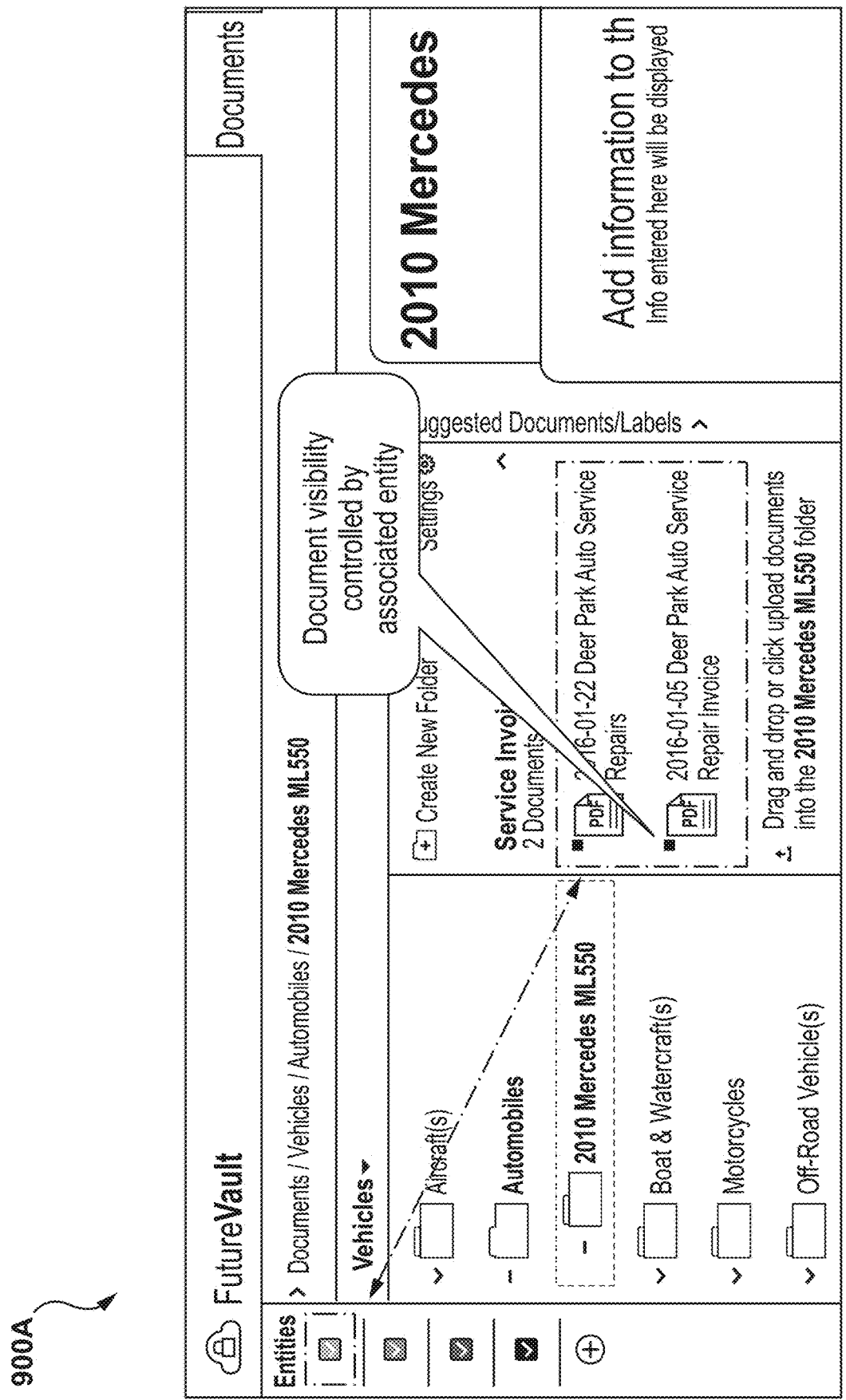
FIG. 9A illustrates a screenshot of another example user interface for filtering file icons by entity status in accordance with an example embodiment.
Figure 9B:
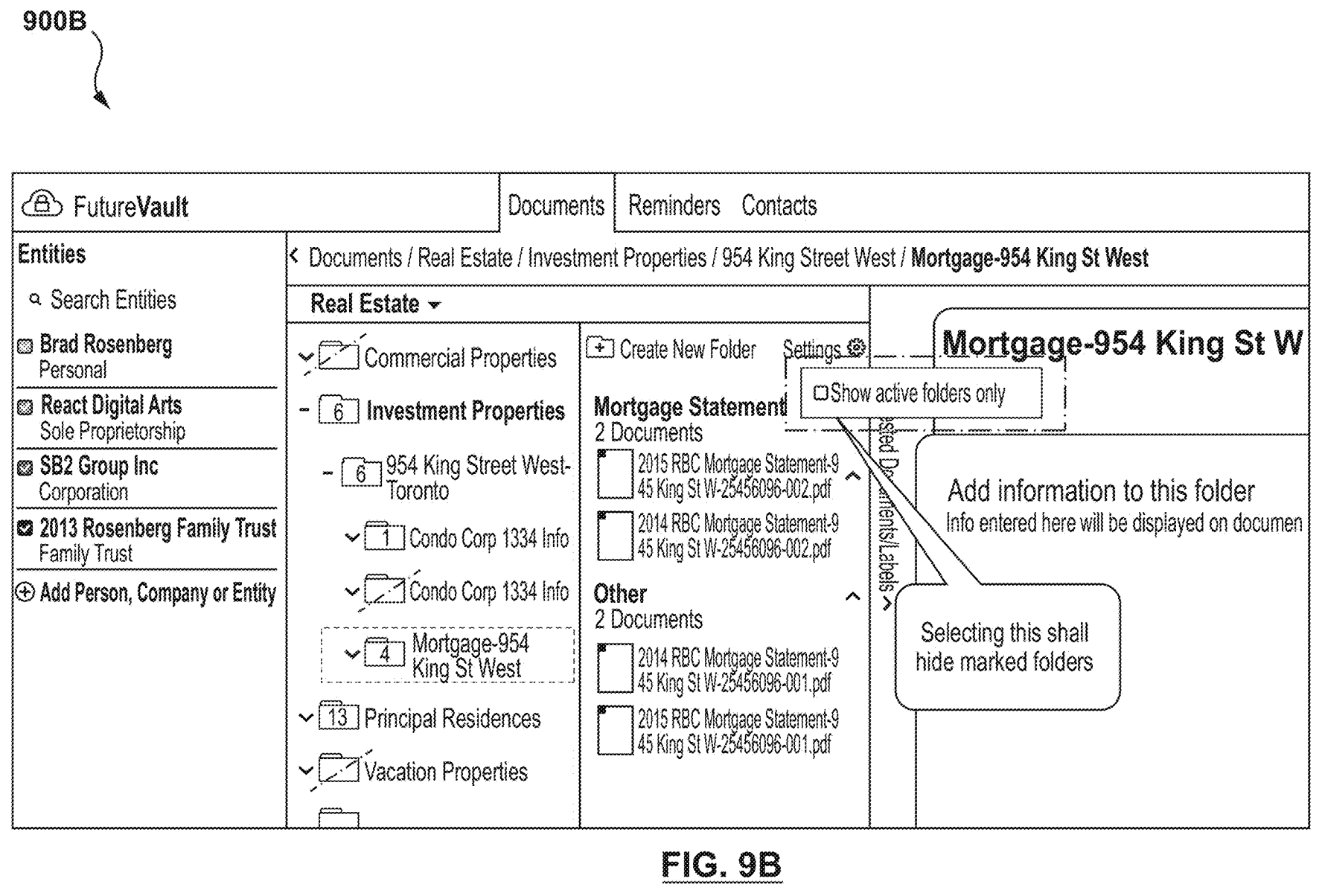

Referring now to FIG. 9A, shown therein is another example user interface 900A that may be displayed to a user. The user interface 900A also illustrates how the document icons displayed to a user can be controller based on the currently selected entity identifiers and the document's entity associations.

Referring now to FIG. 9B, shown therein is another example user interface 900B that may be displayed to a user. The user interface 900B illustrates some document categories (indicated with a slash) that are currently displayed to a user that may be hidden if a user chooses to hide empty folders. The active status for such document categories in the non-relational database is set to inactive, as there are no documents stored therein. Thus, when a user selects the indicated function to hide empty folders, the inactive icon status can be identified and used to hide those category icons.

Figure 9C:
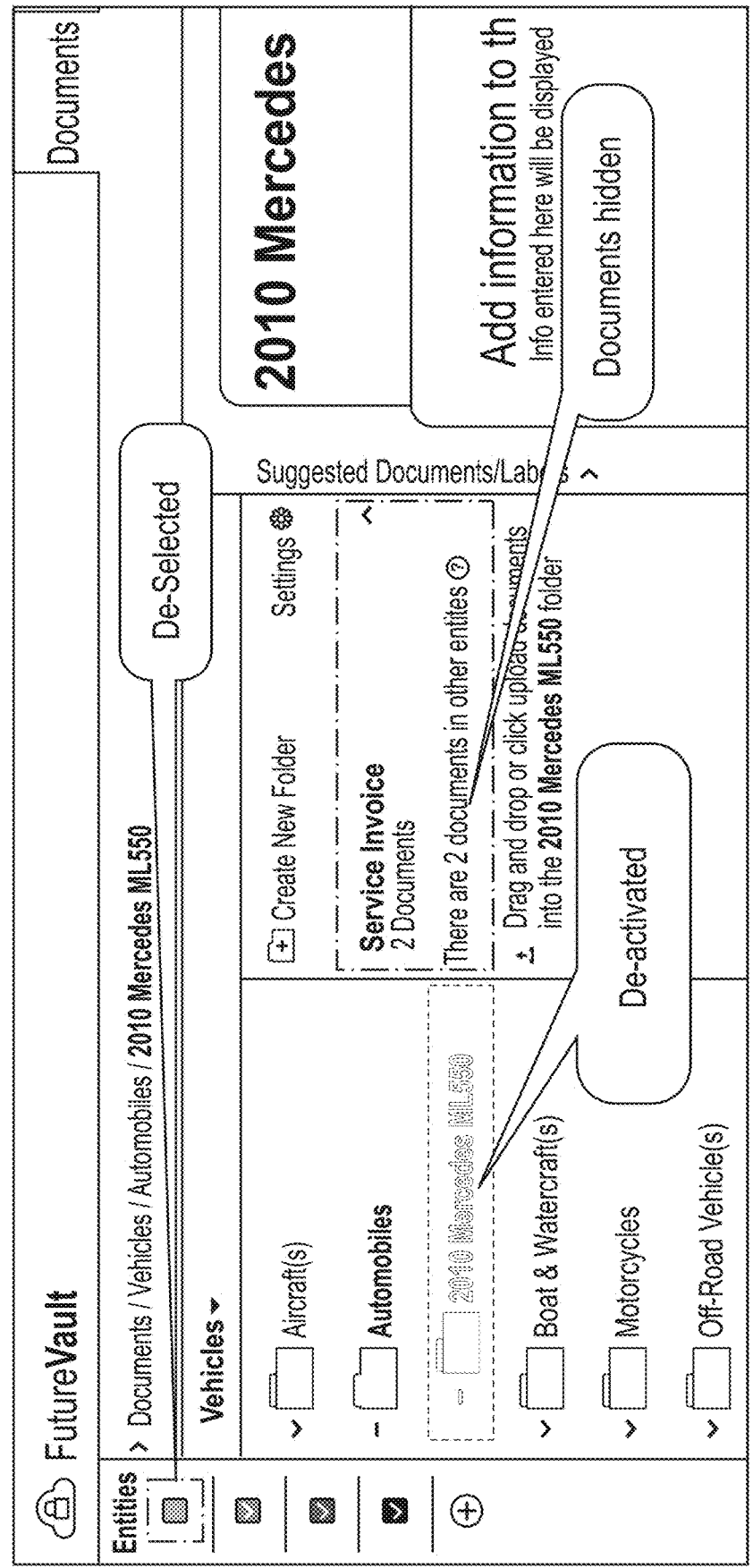
FIG. 9C illustrates a screenshot of another example user interface of file icons filtered by entity status in accordance with an example embodiment.

Referring now to FIG. 9C, shown therein is another example user interface 900C that may be displayed to a user. In some cases, as shown in user interface 900C category icons that are inactive may be displayed with a modified icon indicating that they are inactive (for example as a faded or differently colored icon. In some cases, the user may also be provided with an indication that a document category has documents stored therein that are associated with an unselected entity, as shown in user interface 900C. This may indicate to the user that they should select a currently deselected entity identifier, for instance if a user has navigated to a category folder that appears to be empty without noticing that the pertinent entity identifier is not selected.

Figure 10:
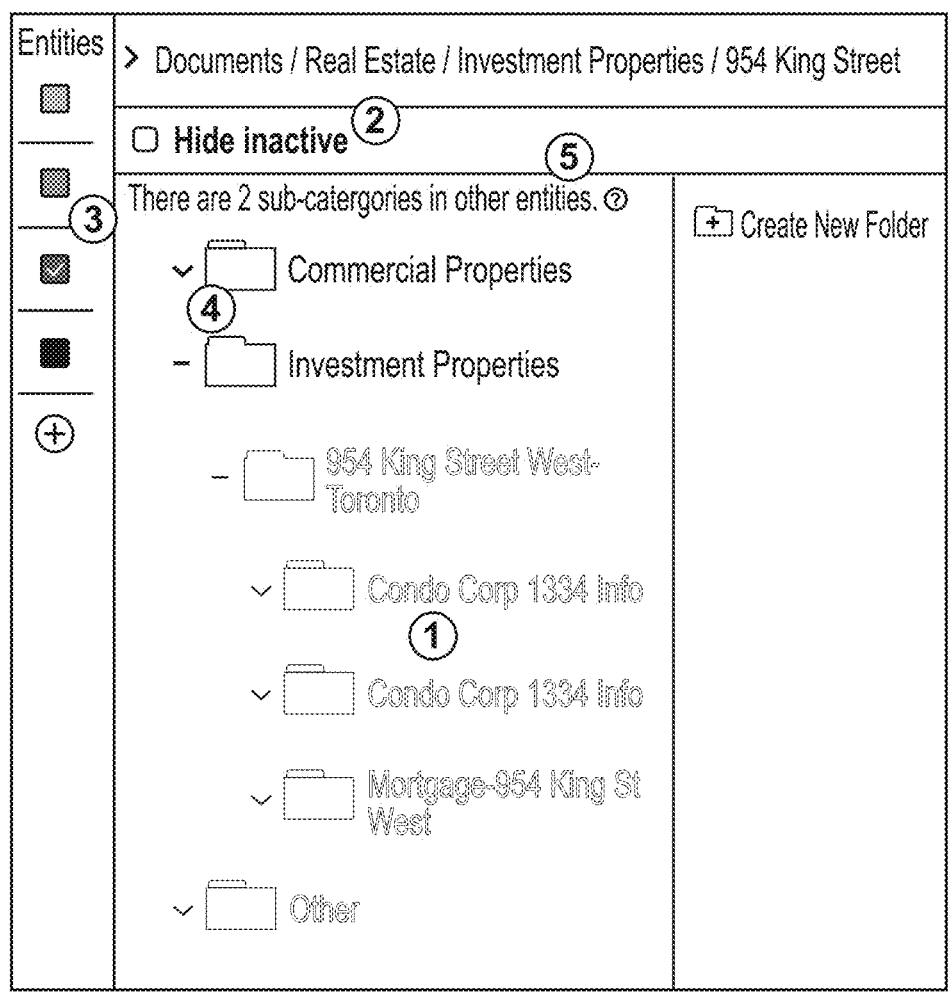
FIG. 10 illustrates a screenshot of another example user interface for filtering file icons in accordance with an example embodiment.

Referring now to FIG. 10, shown therein is another example user interface 1000 that may be displayed to a user. User interface 1000 illustrates various features that may be provided to a user of the document filtering application 134. As user interface 1000 indicates at 1, inactive document categories may be faded while still being displayed to a user. These inactive document categories 1 may be faded relative to the active document category icons 4 being displayed. This may allow a user to select and navigate through those categories, while still indicating that those categories do not include documents associated with the currently selected entity identifier. As shown at 2, a user may select a "hide inactive" feature so that the inactive category icons may be hidden rather than modified or faded as shown here. If none of the category icons in the currently displayed category path are inactive, the "hide inactive" feature may be hidden. In some cases, for instance if the "hide inactive" feature is hidden, a hidden icon indicator 5 may be shown to a user. A hidden icon indicator may indicate that there are documents or categories within the currently selected parent category that are associated with entities other than the currently-selected entity identifiers. As shown at 3, a user may select or de-select various entity identifiers to modify the categories and documents currently displayed.

Referring now to FIG. 11, shown therein is another example user interface 1100 that may be displayed to a user. User interface 1100 illustrates how document counts for various folders and sub-folders may be displayed to a user navigating the documents in relational database 130, based on the category document counts stored in non-relational database 132.

Figure 12:
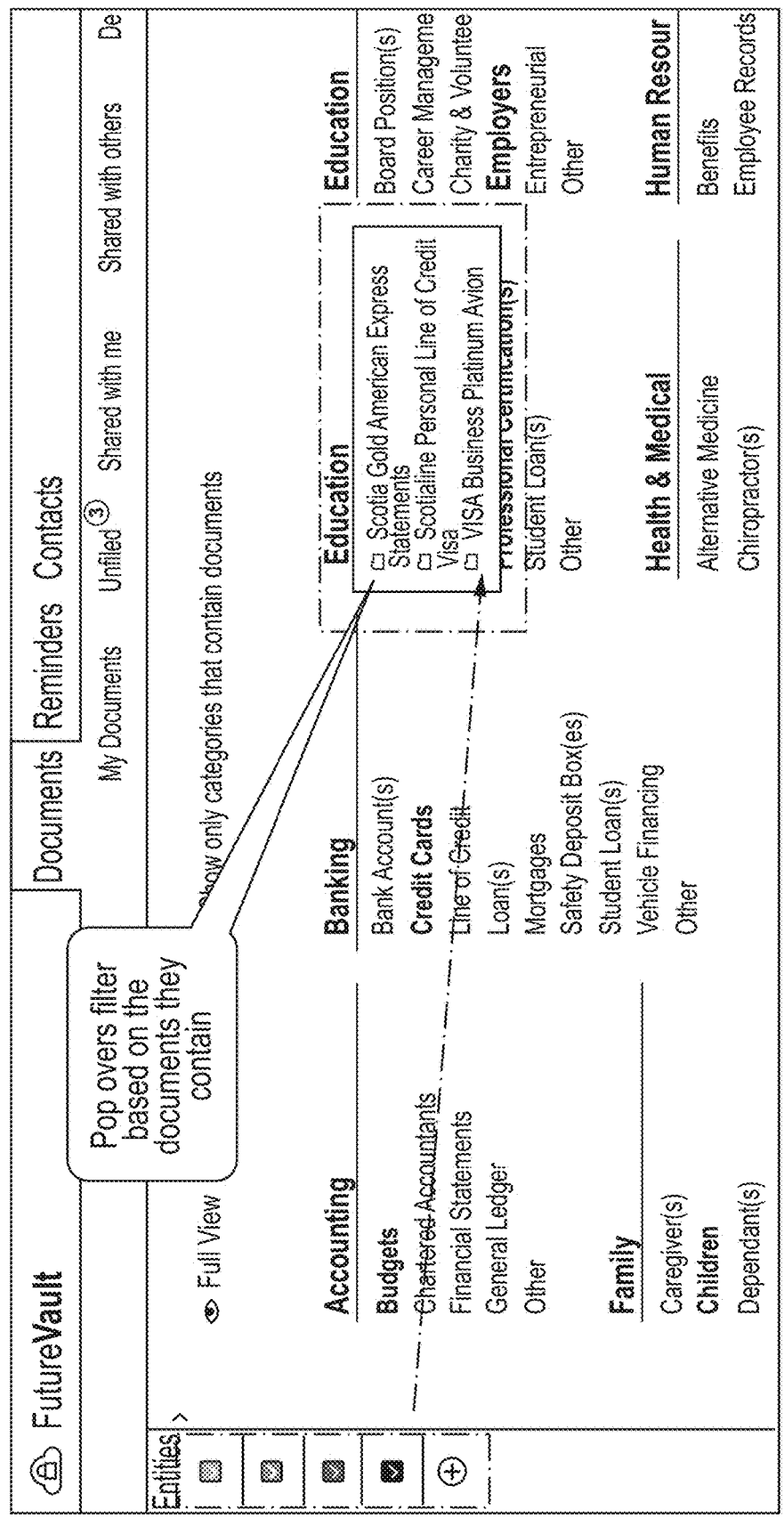
FIG. 12 illustrates a screenshot of a further example user interface for filtering file icons in accordance with an example embodiment.

Referring now to FIG. 12, shown therein is another example user interface 1200 that may be displayed to a user. User interface 1200 illustrates an example of a preview filter that may be used in embodiments described herein. By hovering over a category icon a user may be provided with a preview of sub-categories and or documents nested therein, for example using "pop-overs", that are associated with the currently-selected entity identifier(s).

Referring now to FIG. 13, shown therein is an example non-relational database structure 1300 that may be used in implementations of the non-relational database storage 132. The example non-relational database structure 1300 illustrates an example of a graph database used to implement the non-relational database storage 132.

As shown in the graph database 1300, a plurality of document nodes can be defined. Each document node generally represents/corresponds to one of the documents stored in the relational database 130. Each document node has a plurality of document node attributes, such as a document ID, a document name, and one or more entity associations.

The graph database 1300 also includes a plurality of category/folder nodes. Each category/folder node generally corresponds to one of the categories or folders used to stored documents in the relational database 130. The category nodes include category node attributes including a category ID, a category name, one or more category associations (which effectively correspond to entity associations but for a category rather than a document), and a document count. Both category nodes and document nodes may also include active icon attributes, such as active icon flags.

A plurality of relations/edges are defined between the category nodes and document nodes, as well as between the category nodes and parent category nodes. Using these relations defined in the graph database 1300, a category node can automatically inherit entity associations from the documents associated therewith. In some cases, a document may have a relation with multiple categories. In such cases, the relations allow the category associations/document counts/active icon statuses for the relevant categories to be automatically updated in response to modifications to that document node. Similarly, modifications to document nodes and to category nodes can be directly inherited up the relationship hierarchy or tree to rapidly update multiple category nodes.

In the embodiments described herein, a relational database 130 may be used to store documents, document categories, and entity identifiers while a non-relational database 132 may store associations between the documents and entity identifiers and categories and entity identifiers, as well as document counts for document categories and an icon status for the documents and categories. This may provide for real-time filtering and display of data for a user navigating a document management system.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method for organizing and displaying in real-time data related to a plurality of documents, the method comprising:
storing a plurality of documents and a plurality of document categories in a relational database storage;
assigning each document in the plurality of documents to at least one of the document categories;
storing a plurality of user identifiers in the relational database storage, each of the plurality of user identifiers having an entity type selected from a plurality of entity types;
recording, in a non-relational database storage, a plurality of user associations between the plurality of user identifiers and the plurality of documents, wherein each user association comprises a relationship between one or more user identifiers from the plurality of user identifiers and a selected document in the plurality of documents;
recording, in the non-relational database storage, a plurality of category associations between the plurality of user identifiers and the plurality of document categories, wherein each category association comprises a category relationship between a selected category in the plurality of document categories and the one or more user identifiers; and
displaying a plurality of file icons in a display interface, the plurality of file icons including active icons corresponding to a selection of at least one of the plurality of documents and the plurality of document categories, wherein the selection is determined by:
querying the non-relational database storage using at least one currently-selected user identifier;
recording in the non-relational database storage a document count for each of the document categories in the plurality of document categories, the document count for each document category indicating a number of documents in the selection of the plurality of documents associated with that document category,
wherein the plurality of document categories are recorded in the non-relational data base storage as a category hierarchy including at least one parent category and at least one sub-category nested within each parent category, wherein the category associations for each parent category inherit the category associations for each of the at least one sub-category nested within that parent category, wherein the document count in the non-relational database storage for each parent category is determined by inheriting the document count from each sub category nested within that parent category;

determining a selected plurality of document categories by querying the plurality of category associations in the non-relational database storage using the at least one currently-selected user identifier; and determining the plurality of file icons to include a plurality of category icons corresponding to the selected plurality of document categories.

2. The method of claim 1, wherein the plurality of category associations are determined by:

defining default category associations for each entity type; and determining the plurality of category associations to include the default category associations for the entity type of each user identifier.

3. A method of claim 1, further comprising:

storing an additional document in the relational database storage associated with a first document sub-category;

updating the user associations by defining in the non-relational database storage a relationship between the additional document and a particular user identifier, wherein the particular user identifier is not associated with the first document sub-category; and updating the category associations in the non-relational database storage for the first document sub-category to include the particular user identifier.

4. The method of claim 1, further comprising:

determining the selected plurality of document categories to include all of the document categories associated with the entity type of each of the at least one currently selected user identifier.

5. The method of claim 1, further comprising:

recording in the non-relational database storage an icon status for each of the document categories in the plurality of document categories, wherein the icon status for each document category is an active icon status indicating that the corresponding category icon is an active icon when at least one of the documents in the selection of the plurality of documents is assigned to that document category and is an inactive icon status otherwise.

6. The method of claim 1, wherein the plurality of file icons displayed include only the active document icons corresponding to the determined selection of the plurality of documents.

7. The method of claim 1, further comprising:

modifying the user associations for a second selected document in the plurality of documents; and automatically triggering an update to the category associations for each of the document categories associated with the second selected document using the modified user association for that second selected document.

8. The method of claim 3, further comprising automatically updating the category associations in the non-relational database storage for each parent category the first document sub-category is nested within.

9. The method of claim 5, wherein the icon status in the non-relational database storage for each parent category is determined by inheriting the icon status of each sub-category nested within that parent category, and the icon status for the parent category is an active icon status when at least one inherited icon status is active.

10. A non-transitory computer program product for organizing and displaying in real-time data related to a plurality of documents, the computer program product comprising a non-transitory computer readable storage medium and computer-executable instructions stored on the computer readable storage medium, the instructions for configuring a processor to:

store a plurality of documents and a plurality of document categories in a relational database storage, wherein each of the documents in the plurality of documents is assigned to at least one of the document categories;

store a plurality of user identifiers in the relational database storage, each of the plurality of user identifiers having an entity type selected from a plurality of entity types;

record, in a non-relational database storage, a plurality of user associations between the plurality of user identifiers and the plurality of documents, wherein each user association comprises a relationship between one or more user identifiers from the plurality of user identifiers and a selected document in the plurality of documents;

record, in the non-relational database storage, a plurality of category associations between the plurality of user identifiers and the plurality of document categories, wherein each category association comprises a category relationship between a selected category in the plurality of document categories and one or more user identifiers; and display a plurality of file icons in a display interface, the plurality of file icons including active icons corresponding to a selection of at least one of the plurality of documents and the plurality of document categories, wherein the selection is determined by:

querying the non-relational database storage using at least one currently-selected user identifier;

recording in the non-relational database storage a document count for each of the document categories in the plurality of document categories, the document count for each document category indicating a number of documents in the selection of the plurality of documents associated with that document category, wherein the plurality of document categories are recorded in the non-relational data base storage as a category hierarchy including at least one parent category and at least one sub-category nested within each parent category, wherein the category associations for each parent category inherit the category associations for each of the at least one sub-category nested within that parent category, wherein the document count in the non-relational database storage for each parent category is determined by inheriting the document count from each sub category nested within that parent category;

determining a selected plurality of document categories by querying the plurality of category associations in the non-relational database storage using the at least one currently-selected user identifier; and determining the plurality of file icons to include a plurality of category icons corresponding to the selected plurality of document categories.

11. A system for organizing and displaying in real-time data related to a plurality of documents, the system comprising:

a relational database storage;
a non-relational database storage coupled to the relational database storage; and
a server in communication with the relational database storage and the non-relational database storage, the server configured to store a plurality of documents and a plurality of document categories in the relational database storage;
assign each document in the plurality of documents to at least one of the document categories;
store a plurality of user identifiers in the relational database storage, each of the plurality of user identifiers having an entity type selected from a plurality of entity types;
record, in the non-relational database storage, a plurality of user associations between the plurality of user identifiers and the plurality of documents, wherein each user association comprises a relationship between one or more user identifiers from the plurality of user identifiers and a selected document in the plurality of documents;
record, in the non-relational database storage, a plurality of category associations between the plurality of user identifiers and the plurality of document categories, wherein each category association comprises a category relationship between a selected category in the plurality of document categories and one or more user identifiers; and
determine a plurality of file icons to be displayed in a display interface of a device in communication with the server, the plurality of file icons including active icons corresponding to a selection of at least one of the plurality of documents and the plurality of document categories, wherein the selection is determined by:
querying the non-relational database storage using at least one currently selected user identifier;
recording in the non-relational database storage a document count for each of the document categories in the plurality of document categories, the document count for each document category indicating a number of documents in the selection of the plurality of documents associated with that document category,
wherein the plurality of document categories are recorded in the non-relational data base storage as a category hierarchy including at least one parent category and at least one sub-category nested within each parent category,
wherein the category associations for each parent category inherit the category associations for each of the at least one sub-category nested within that parent category,
wherein the document count in the non-relational database storage for each parent category is determined by inheriting the document count from each sub category nested within that parent category;
determining a selected plurality of document categories by querying the plurality of category associations in the non-relational database storage using the at least one currently-selected user identifier; and
determining the plurality of file icons to include a plurality of category icons corresponding to the selected plurality of document categories.

12. The system of claim 11, wherein the server is configured to determine the plurality of category associations by:
defining default category associations for each entity type; and
determining the plurality of category associations to include the default category associations for the entity type of each user identifier.

13. The system of claim 11, wherein the server is further configured to:
store an additional document in the relational database storage associated with a first document sub-category;
update the user associations by defining in the non-relational database storage a relationship between the additional document and a particular user identifier, wherein the particular user identifier is not associated with the first document sub-category; and
update the category associations in the non-relational database storage for the first document sub-category to include the particular user identifier.

14. The system of claim 11, wherein the server is further configured to:
determine the selected plurality of document categories to include all of the document categories associated with the entity type of each of the at least one currently selected user identifier.

15. The system of claim 11, the server is further configured to:
record in the non-relational database storage an icon status for each of the document categories in the plurality of document categories, wherein the icon status for each document category is an active icon status indicating that the corresponding category icon is an active icon when at least one of the documents in the selection of the plurality of documents is assigned to that document category and is an inactive icon status otherwise.

16. The system of claim 11, wherein the server is configured to determine the plurality of file icons to be displayed to include only the active document icons corresponding to the determined selection of the plurality of documents.

17. The system of claim 11, wherein the server is further configured to:
modify the user association for a second selected document in the plurality of documents; and
automatically trigger an update to the category associations for each of the document categories associated with the second selected document using the modified user association for that second selected document.

18. The system of claim 13 wherein the server is further configured to trigger an automatic update of the category associations in the non-relational database storage for each parent category the first document sub-category is nested within.

19. The system of claim 15, wherein the server is configured to determine the icon status in the non-relational database storage for each parent category by inheriting the icon status of each sub category nested within that parent category, and the icon status for the parent category is an active icon status when at least one inherited icon status is active.

* * * * *